US008855943B1

(12) United States Patent
Matsui et al.

(10) Patent No.: US 8,855,943 B1
(45) Date of Patent: Oct. 7, 2014

(54) FATIGUE MONITORING SYSTEM AND METHODS

(75) Inventors: Gen Matsui, Bothell, WA (US); Douglas B. Kirkland, Mukilteo, WA (US)

(73) Assignee: The Boeing Company, Chicago, IL (US)

(*) Notice: Subject to any disclaimer, the term of this patent is extended or adjusted under 35 U.S.C. 154(b) by 423 days.

(21) Appl. No.: 13/286,182

(22) Filed: Oct. 31, 2011

(51) Int. Cl.
*G01B 3/44* (2006.01)
*G01B 3/52* (2006.01)
*G06F 19/00* (2011.01)
*B61C 13/00* (2006.01)
*G01M 5/00* (2006.01)

(52) U.S. Cl.
CPC ............ *G01M 5/0033* (2013.01); *B61C 13/00* (2013.01)
USPC .................... 702/34; 244/1 R; 73/769; 702/41

(58) Field of Classification Search
CPC .............. G01N 2203/0033; G01N 2203/0016; G01N 2203/0073; G01N 3/08; G01N 3/32; G01M 5/0075; G01M 5/0033; B61C 13/00; F16D 2066/05
USPC ........ 702/33–36, 41, 42, 43, 105, 144; 73/81, 73/82, 162, 767, 769, 799; 244/1 R; 701/3
See application file for complete search history.

(56) References Cited

U.S. PATENT DOCUMENTS

| | | | |
|---|---|---|---|
| 4,480,480 A * | 11/1984 | Scott et al. ...................... | 73/769 |
| 5,881,971 A | 3/1999 | Hickman | |
| 7,930,112 B2 * | 4/2011 | Mattes ............................. | 702/36 |

* cited by examiner

*Primary Examiner* — John H Le
(74) *Attorney, Agent, or Firm* — Ameh IP; Elahe Toosi; Lowell Campbell

(57) ABSTRACT

A system and methods for actuator fatigue monitoring is disclosed. At least two measured actuator forces are received from at least two actuators respectively, and a hybrid force is calculated. The hybrid force is calculated based on a force fight of the at least two actuators calculated based on the at least two measured actuator forces, and a monitored actuator force among the at least two measured actuator forces. An air load of the at least two actuators is estimated based on the at least two measured actuator forces, and a fatigue anomaly is determined based on the hybrid force and the air load.

20 Claims, 16 Drawing Sheets

FATIGUE MONITORING SYSTEM AND METHODS

FIELD

Embodiments of the present disclosure relate generally to structural anomaly detection. More particularly, embodiments of the present disclosure relate to real-time structural fatigue monitoring and anomaly detection.

BACKGROUND

Vehicle or aircraft structures are typically subject to a variety of expected and unexpected exogenous operational forces throughout their operational life. Operational health of such structures may be adversely affected by an anomalous structural response to the expected and unexpected exogenous operational forces. Operational forces such as changes in aerodynamic loading and unexpected forces such as wind gusts may result in non-optimal structural conditions.

SUMMARY

A system and methods for actuator fatigue monitoring is disclosed. At least two measured actuator forces are received from at least two actuators respectively, and a hybrid force is calculated. The hybrid force is calculated based on a force fight of the two actuators calculated based on the two measured actuator forces, and a monitored actuator force among the two measured actuator forces. An air load of the two actuators is estimated based on the two measured actuator forces, and a fatigue anomaly is determined based on the hybrid force and the air load. In this manner, a system and methods are provided for monitoring a structural anomaly and deactivating a non-optimal actuator.

In an embodiment, a method for actuator fatigue monitoring receives at least two measured actuator forces from at least two actuators respectively, and calculates a hybrid force. The hybrid force is calculated based on a force fight of the at least two actuators calculated based on the at least two measured actuator forces, and a monitored actuator force among the at least two measured actuator forces. The method further estimates an air load of the at least two actuators based on the at least two measured actuator forces, and determines a fatigue anomaly based on the hybrid force and the air load.

In another embodiment, an actuator fatigue monitoring system comprises a force sensor, a hybrid force computation module, an air load calculation module, and an anomaly isolation logic module. The force sensor is operable to monitor at least two measured actuator forces from at least two actuators respectively. The hybrid force computation module is operable to calculate a hybrid force based on a force fight of the at least two actuators based on the at least two measured actuator forces, and a monitored actuator force among the at least two measured actuator forces. The air load calculation module is operable to estimate an air load of the at least two actuators based on the at least two measured actuator forces. The anomaly isolation logic module is operable to determine a fatigue anomaly based on the hybrid force and the air load.

In a further embodiment, a computer readable storage medium comprising computer-executable instructions for performing a method for fatigue monitoring. The method executed by the computer-executable instructions receives at least two measured actuator forces from at least two actuators respectively, and calculates a hybrid force. The hybrid force is calculated based on a force fight of the at least two actuators calculated based on the at least two measured actuator forces, and a monitored actuator force among the at least two measured actuator forces. The method executed by the computer-executable instructions further estimates an air load of the at least two actuators based on the at least two measured actuator forces and determines a fatigue anomaly based on the hybrid force and the air load.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to control laws, control systems, measurement techniques, measurement sensors, actuators, data transmission, signaling, network control, and other functional aspects of the systems (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a practical non-limiting application, namely, detecting anomaly in an aircraft flight control surface. Embodiments of the disclosure, however, are not limited to such aircraft structure, and the techniques described herein may also be utilized in other applications. For example but without limitation, embodiments may be applicable to manned and unmanned ground, air, space, water and underwater vehicles, windmills, or other machinery.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
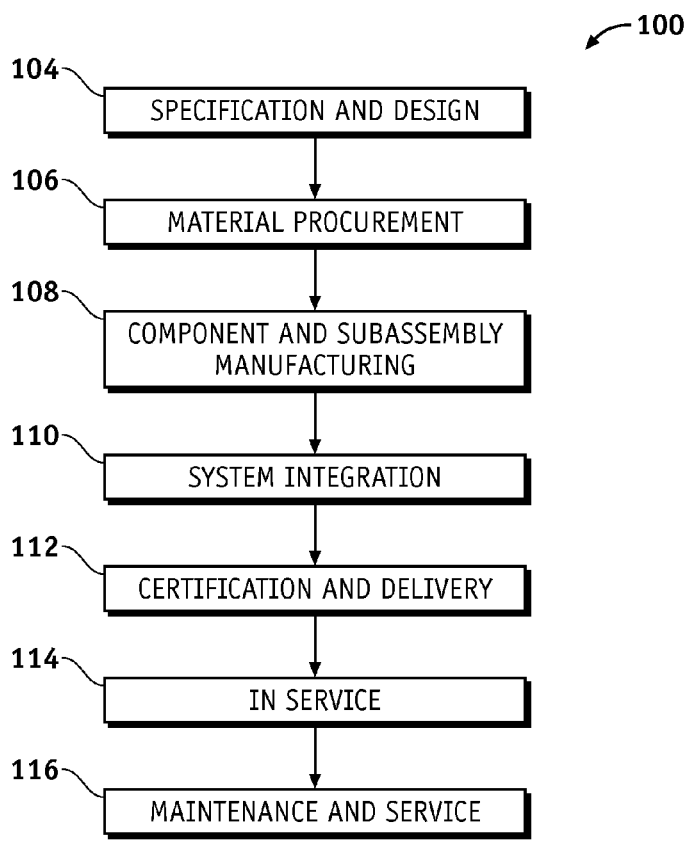
FIG. 1 is an illustration of a flow diagram of an exemplary aircraft production and service methodology.
Figure 2:
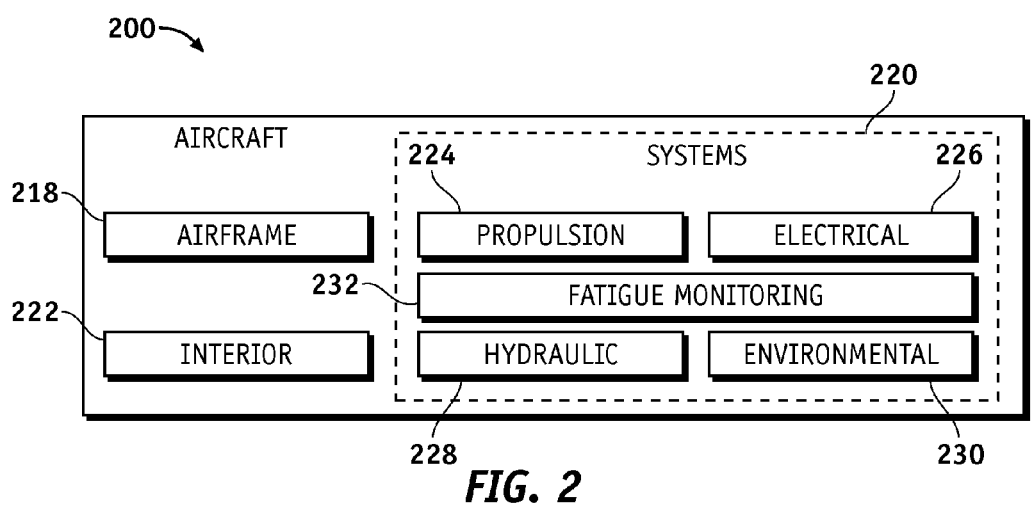
FIG. 2 is an illustration of an exemplary block diagram of an aircraft.

Referring more particularly to the drawings, embodiments of the disclosure may be described in the context of an exemplary aircraft manufacturing and service method 100 (method 100) as shown in FIG. 1 and an aircraft 200 as shown in FIG. 2. During pre-production, the method 100 may comprise specification and design 104 of the aircraft 200, and material procurement 106. During production, component and subassembly manufacturing process 108 (production stage 108) and system integration 110 (production stage 110) of the aircraft 200 takes place. Thereafter, the aircraft 200 may go through certification and delivery 112 in order to be placed in service 114. While in service by a customer, the aircraft 200 is scheduled for routine maintenance and service 116 (which may also comprise modification, reconfiguration, refurbishment, and so on).

Each of the processes of method 100 may be performed or carried out by a system integrator, a third party, and/or an operator (e.g., a customer). For the purposes of this description, a system integrator may comprise, for example but without limitation, any number of aircraft manufacturers and major-system subcontractors; a third party may comprise, for example but without limitation, any number of vendors, subcontractors, and suppliers; and an operator may comprise, for example but without limitation, an airline, leasing company, military entity, service organization, and the like.

As shown in FIG. 2, the aircraft 200 (aircraft 200) produced by the method 100 may comprise an airframe 218 with a plurality of systems 220 and an interior 222. Examples of high-level systems of the systems 220 comprise one or more of a propulsion system 224, an electrical system 226, a hydraulic system 228, an environmental system 230, and a fatigue monitoring system 232. Any number of other systems may also be included. Although an aerospace example is shown, the embodiments of the disclosure may be applied to other industries.

Apparatus and methods embodied herein may be employed during any one or more of the stages of the method 100. For example, components or subassemblies corresponding to production stage 108 may be fabricated or manufactured in a manner similar to components or subassemblies produced while the aircraft 200 is in service. In addition, one or more apparatus embodiments, method embodiments, or a combination thereof may be utilized during production stages 108 and 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

Flight control surfaces are deflected by actuator(s) (hydraulically or electrically powered) to ultimately control a flight path. Such flight control surfaces may comprise, for example but without limitation, elevators for pitch control, ailerons and flaperons for roll control, rudder for yaw control, or other flight control surface. There are often multiple actuators attached to a single flight control surface in parallel, and in many cases, they may all be activated in normal conditions. There are control mechanisms (e.g., electronic, mechanical) that control a deflection to which each actuator positions the flight control surface. In normal conditions, the actuators on a single surface work in unison to deflect the flight control surface to the commanded position. However, an anomaly in an actuator or its controller may cause the affected actuator ("non-optimal actuator") to try to deflect the flight control surface to a position other than the commanded position.

If this occurs, the non-optimal actuator would "force fight" against the other actuator(s) on the flight control surface. Change in a magnitude of force causes fatigue anomaly on local structures (e.g., the surface itself, hinges that attach the surface to the rest of the aircraft 200, attachment of the actuator to the surface, attachment of the actuator to the rest of the aircraft 200, etc.). Oscillatory failures are of particular significance because a repeated change and reversal in force may introduce fatigue. If the fatigue exceeds a structural capability, structural anomaly could follow. Such an anomaly during flight may result in non-optimal operation of the aircraft 200.

Embodiments of the disclosure provide a system and methods to prevent a structural anomaly by detecting an anomaly in real-time and shutting down anomaly conditions causing excessive fatigue. In-flight anomaly detection can permit employment of flight controls that mitigate effects of structural anomaly; preventing more anomaly propagation that could lead to extensive repair of the aircraft 200. An indication of structural anomaly can also provide information to maintenance crews by indicating a need for on ground structural evaluation of the aircraft 200. This information can lengthen a required interval between on ground structural evaluations, and thus saves cost.

The term real-time refers to a signal that is continuously being sent and received, with little or no time delay. The term near-real-time refers to a real-time signal with substantially no significant time delay. The time delay may be a delay introduced by, for example but without limitation, automated data processing or network transmission, between occurrence of an event, and the like. In this document, the term real-time refers to both real-time and near-real-time.

Figure 3:
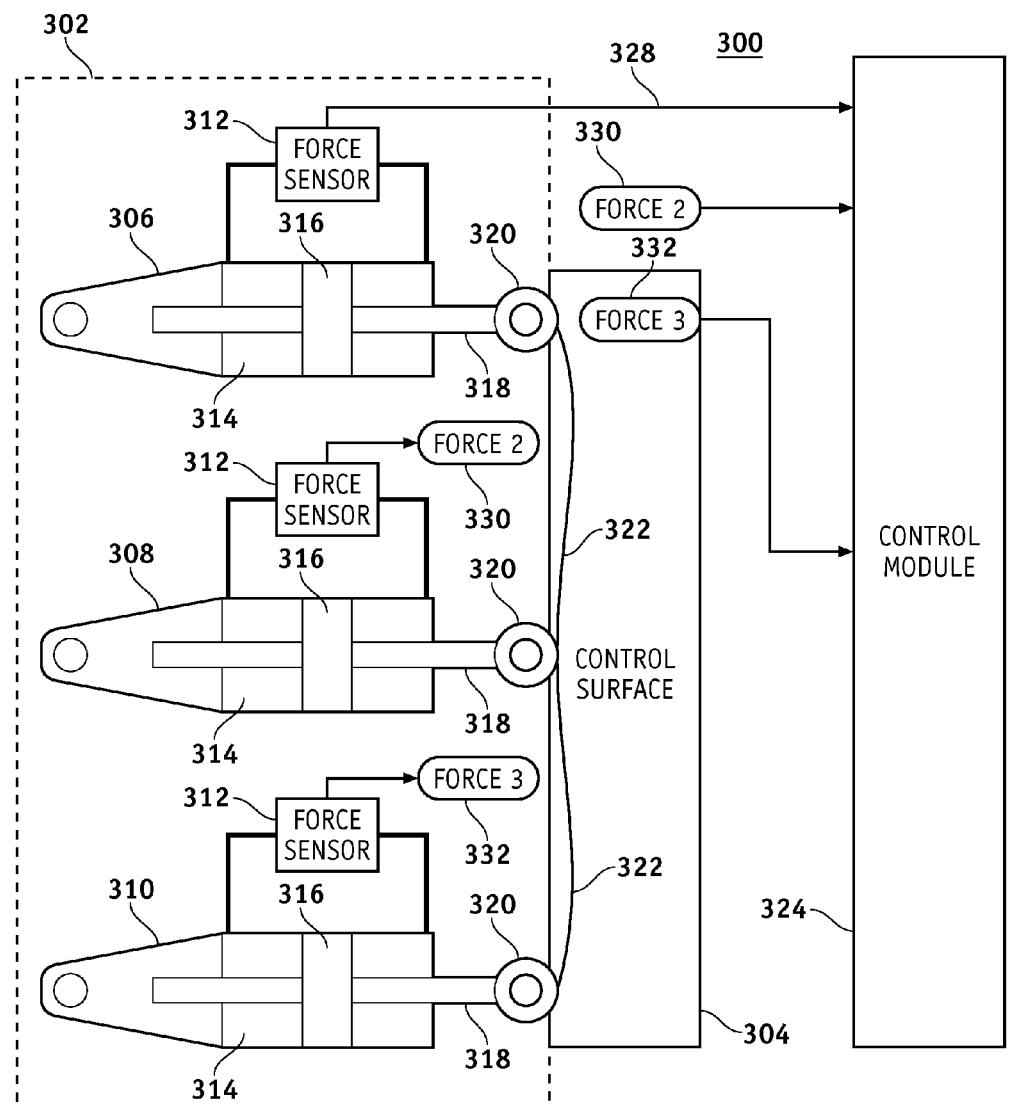
FIG. 3 is an illustration of an exemplary fatigue monitoring system according to an embodiment of the disclosure.

FIG. 3 is an illustration of an exemplary fatigue monitoring system 300 (system 300) according to an embodiment of the disclosure. While the system 300 is applicable to a wide range of subsystems of a primary aircraft flight control system, an exemplary subsystem is schematically illustrated in FIG. 3. The system 300 may comprise a three actuator configuration 302 (subsystem 302) for a control surface 304, and a control module 324.

The subsystem 302 may comprise a first actuator 306, a second actuator 308, a third actuator 310, and a plurality of force sensors 312 coupled to the first actuator 306, the second actuator 308, and the third actuator 310 respectively. In the subsystem 302, the three actuators: the first actuator 306, the second actuator 308, and the third actuator 310 act in concert to control a position of the control surface 304.

The control surface 304 may comprise, flight control surface, such as but without limitation, an aileron, a tail, a rudder, an elevator, a flap, a spoiler, or other control surface such as a landing gear door. Flight control surface 304 and the control surface 304 may be used interchangeably in this document.

Each of the actuators 306/308/310 may comprise, for example but without limitation, a cylindrical sleeve 314 filled with hydraulic fluid, an electro-mechanical actuator, or other actuator operable for direct/indirect measurement of an actuator output force. Cylindrical pistons 316, each having a central axially mounted rod 318 (rod 318) extending therefrom, reciprocate within the cylindrical sleeve 314. Pressurized fluid is ported to any side of the cylindrical pistons 316 to move the cylindrical pistons 316, thereby positioning the flight control surface 304 in response to pilot or autopilot commands.

A difference in hydraulic pressure between the two sides of the cylindrical pistons 316, "differential pressure" may be substantially proportional to the air load. This differential pressure is measured and monitored by the force sensor 312. The force sensor 312 monitors at least two measured actuator forces. The nodes 320 (ends 320) of rods 318 extend out of the cylindrical sleeve 314 and are mechanically coupled to the flight control surface 304 so that the rods 318 move in concert to command the flight control surface 304 into a desired orientation.

As mentioned above, in some embodiments, the system 300 may comprise other types of actuators such as an electro-mechanical actuator where a "differential pressure" may not be used to measure a force. In this case, other means of force measurement might be used such as, but without limitation, a strain gage, or other force measurement means.

In normal conditions, the actuators 306/308/310 on a single surface such as the control surface 304 work in unison to deflect the control surface 304 to the commanded position. However, an anomaly in one of actuators 306/308/310 or its controller may cause the affected actuator ("non-optimal actuator") to try to deflect the control surface 304 to a position other than the commanded position. If this occurs, the non-optimal actuator would "force fight" against the other actuator(s) on the control surface 304.

While an actual mechanical coupling of the rods 318 with the flight control surface 304 is not illustrated in FIG. 3, the structural stiffness of the coupling to the control surface 304 may be represented by a beam 322. Thus, for instance, if any of actuators 306/308/310 is performing non-optimally, resulting in relative out of sync force between the rods 318, then different loads are applied to each node 320 of the beam 322. As a consequence, different mechanical loads are applied to the three actuators 306/308/310.

If the non-optimal operation causes these mechanical loads to oscillate, fatigue anomaly may occur and the beam 322, or another structural member, such as but without limitation, the control surface 304, hinges that attach the control surface 304 to the rest of the aircraft 200, the attachment of the actuators 306/308/310 to the control surface 304, and the attachment of the actuators 306/308/310 to the rest of the aircraft 200, may operate non-optimally due to fatigue. As mentioned above, oscillatory failures are of particular significance because of the repeated change and reversal in force, and thus, fatigue that it introduces. If the fatigue exceeds the structural capability, structural anomaly could follow. Such a structural anomaly during flight may result in non-optimal operation of the aircraft 200.

The fatigue monitoring system 300 is operable to prevent a structural anomaly by detecting and shutting down anomaly conditions that cause excessive fatigue of the aircraft 200 during flight as explained in more detail below. In-flight, anomaly detection can permit employment of the flight controls to prevent a structural anomaly and effects of a structural anomaly that could lead to extensive repair of the aircraft 300. Furthermore, preventing a structural anomaly can also prevent anomaly propagation.

The system 300 is explained in more detail in the context of discussion of FIG. 8 below.

Figure 4:
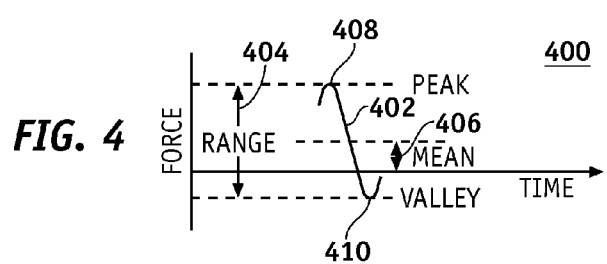
FIG. 4 is an illustration of an exemplary force cycle graph showing "half cycle" force vs. time.

FIG. 4 is an illustration of an exemplary force cycle graph 400 showing a "half cycle" force vs. time curve 402 (curve 402). Fatigue is a function of range 404 and a mean 406 of force cycles (or load cycles). The curve 402 and the resulting fatigue therefrom can be calculated based on the range 404, which is an algebraic difference between successive peak 408 and valley 410 forces, and the mean 406 which is the algebraic average of the successive peak 408 and valley 410 forces.

Force cycles occur on flight control surfaces as a part of normal operation of the aircraft 200. For example, when a flight control surface of the flight control surfaces such as the flight control surface 304 is deflected during flight, the change in the aerodynamic load on the flight control surface 304 would cause a force cycle, and thus fatigue. The aircraft 200 structure is designed to withstand at least a life time of such fatigue, often many life times to provide a margin of optimal operation.

However, for example, actuators that control deflection of flight control surfaces need to be very powerful in order to satisfy the required airplane control capabilities in all flight conditions. When multiple actuators control a surface in parallel, they normally work in unison to share the aerodynamic load. However, as mentioned above, when one of the actuator is misbehaving ("non-optimal actuator"), either due to its internal failure or that of its control system, its output causes the other actuator to fight against it to maintain the commanded deflection; this is referred to as the "force fight". A level of the force fight can be determined by a difference between output forces 328/330/332 (e.g., force 1, force 2, and force 3) of the fighting actuators of the three actuators 306/308/310 on the control surface 304.

In order to discern if a force cycle is induced by normal operation or by an anomaly, the existing system assumes, for the main part, that fatigue resulting from the force fight is induced by an anomaly. In contrast, the embodiment of the disclosure makes a distinction between anomaly-induced force cycles 502/510 and normal operation force cycles 506/512 as explained in more detail below.

Figure 5:
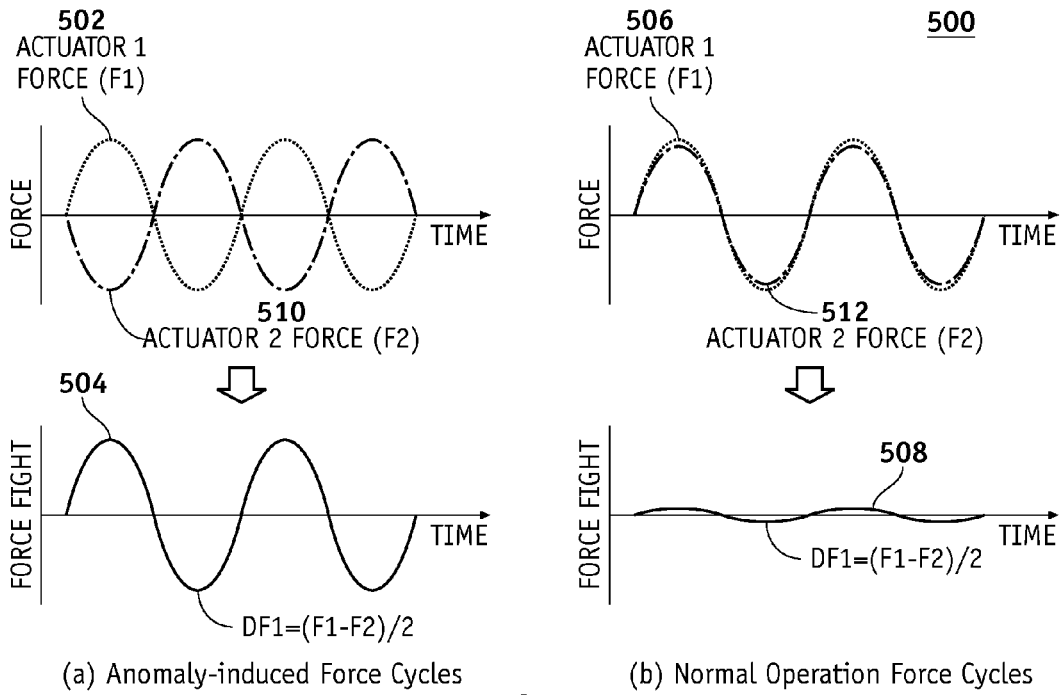
FIG. 5 is an illustration of various force and force fight vs. time graphs showing how a distinction between anomaly-induced force cycles and normal operation force cycles is made.

FIG. 5 is an illustration of various graphs 500 showing how a distinction between anomaly-induced force cycles 502/510 and normal operation force cycles 506/512 is made. In both cases, the resulting fatigue is the same because the anomaly-induced force cycles 502/510 and the normal operation force cycles 506/512 have substantially identical range such as the range 404 and mean 406 (FIG. 4). However, an observed force fight 504 (DF1=F1−(F1+F2)/2=(F1−F2)/2) accurately recreates the range 404 and the mean 406 of the anomaly-induced force cycles 502/510, while the anomaly-induced force cycles 508 is nearly non-existent for the normal operation force cycles 506/512.

Figure 6:
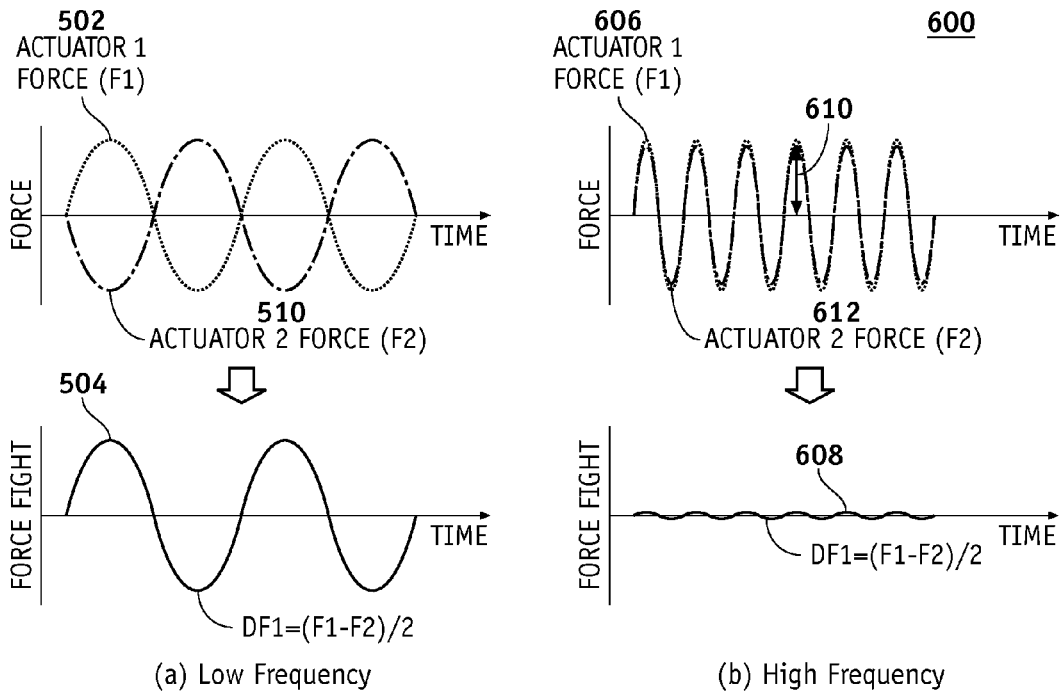
FIG. 6 is an illustration of various force and force fight vs. time graphs showing force fight cycles at low frequencies indicating anomaly-induced force cycles and at high frequencies indicating normal operation force cycles.

However, as shown in FIG. 6, if the oscillation frequency is higher, particularly near the structural resonance frequency of the control surface 304, a phase difference between the non-optimal actuator and the other actuator tends to diminish, and an amplitude 610 of force fight cycles 608 becomes very small compared to the force cycles 606/612, which is causing the fatigue anomaly.

Another effect that is magnified at the high frequency is a timing skew introduced by an asynchronicity between samplings of force data (e.g., force data from the two actuators are not sampled at the same time); this also makes the use of the force fight cycles difficult. These are motivations for the configuration which uses a sum of the low-pass filter output of the force fight and the high-pass filter output of the force (hereafter, "hybrid force") as explained below in the context of discussion of FIG. 8. In this way, the hybrid force indicates force fight at low-frequencies and force at high-frequencies, and the filters are designed to make this transition below a surface resonance frequency of the control surface 304. The underlying assumption here is that the force cycles resulting from normal operation do not have substantial frequency content that would come through the high-pass filter path.

While the existing system may be fundamentally sound and provide good protection, there may be several problems that are encountered for a more general application of a fatigue monitoring system.

A first problem is that the existing system is applicable only to surfaces that are normally not loaded or very lightly loaded. As discussed previously, fatigue is a function of not only the range 404 of the force cycle 400 but also its mean ("offset") 406.

Figure 7:
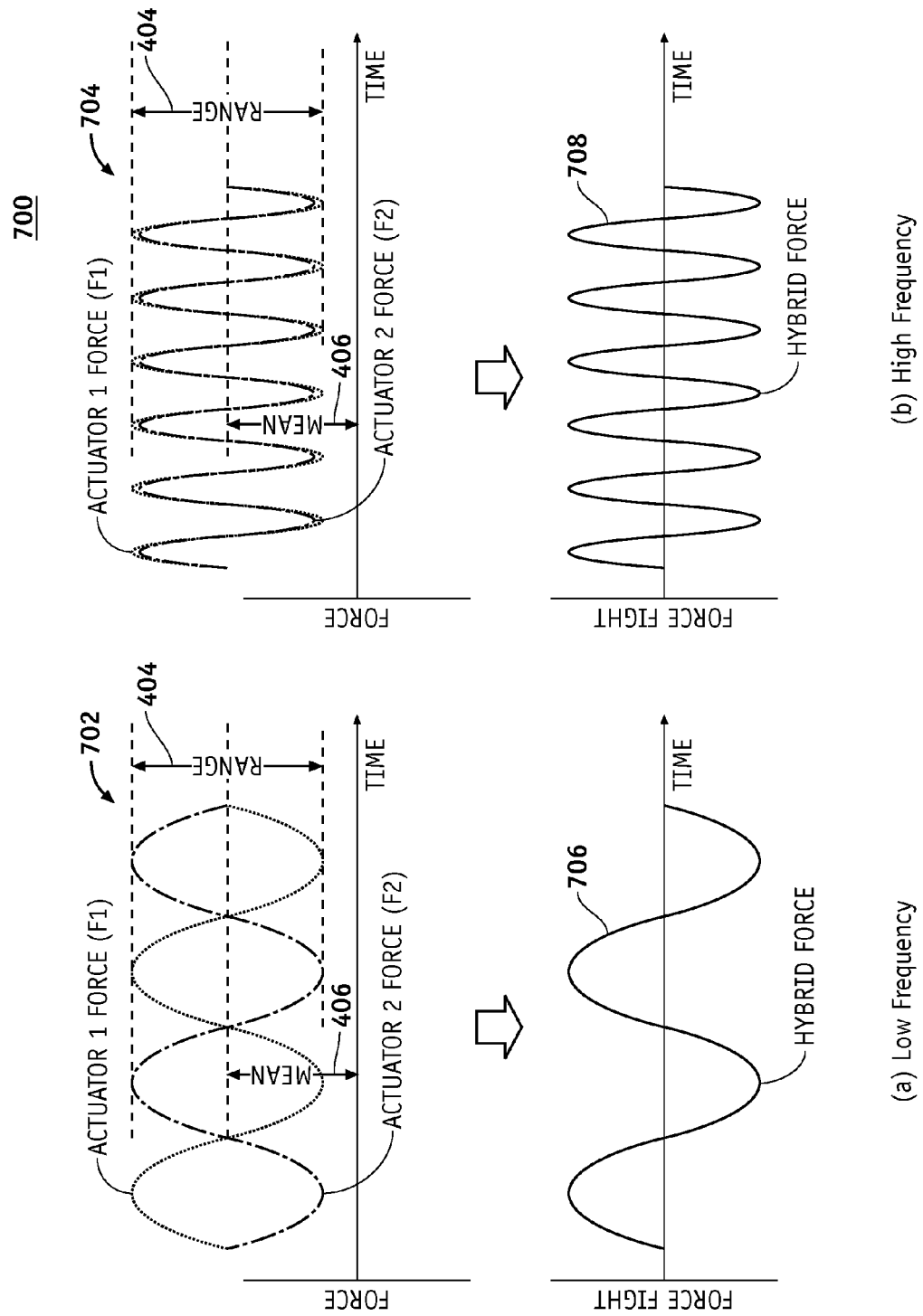
FIG. 7 is an illustration of various force and force fight vs. time graphs showing "offset" compensation according to an embodiment of the disclosure.

FIG. 7 is an illustration of various graphs 700 showing the mean 406 ("offset") compensation according to an embodiment of the disclosure. In order to compute the fatigue resulting from the force cycle 702/704, it is necessary to know the range 404 as well as the mean 406 of the force cycles 702/704. By relying solely on the observed force fight 706 for low-frequency and the high-pass filter output 708 for high-frequency, the existing systems fails to capture the mean 406 ("offset") of the force cycles 702/704. While this problem may not result in significant underestimation of fatigue for surfaces that are not normally loaded or only very lightly loaded (i.e., the mean 406 is close to zero), such as an elevator, the underestimation may become more significant for heavily loaded surfaces, such as an aileron or an flaperon.

A second problem is that existing systems are applicable only to surfaces controlled by two actuators. Typically a surface controlled by two actuators powered by independent airplane hydraulic systems may not be a factor in an airplane continuing to fly and land substantially optimally. It is often necessarily so because anomaly in two airplane hydraulic systems is considered likely enough to require the airplane to be designed to withstand such a condition. This is part of the reason that the existing systems do not need to make any attempt at identifying the non-optimal actuator and simply shuts down both actuators when the anomaly condition is detected. On the other hand, a primary reason for controlling a surface with more than two actuators is because the surface is considered having an influence on an airplane continuing to fly and land optimally.

Therefore, in contrast to the existing systems, the fatigue monitoring system 300 described herein according to embodiments of the disclosure identifies the non-optimal actuator and shuts it down, as opposed to disabling all actuators 306/308/310, and thus, the control surface 304.

The third problem is that the existing systems require a large amount of computation to be processed at a high-rate, contributing significant throughput. In contrast, the embodiments of the disclosure provide an interface module 1700 for significantly reducing the throughput as explained in more detail in the context of discussion of FIG. 17.

Figure 8:
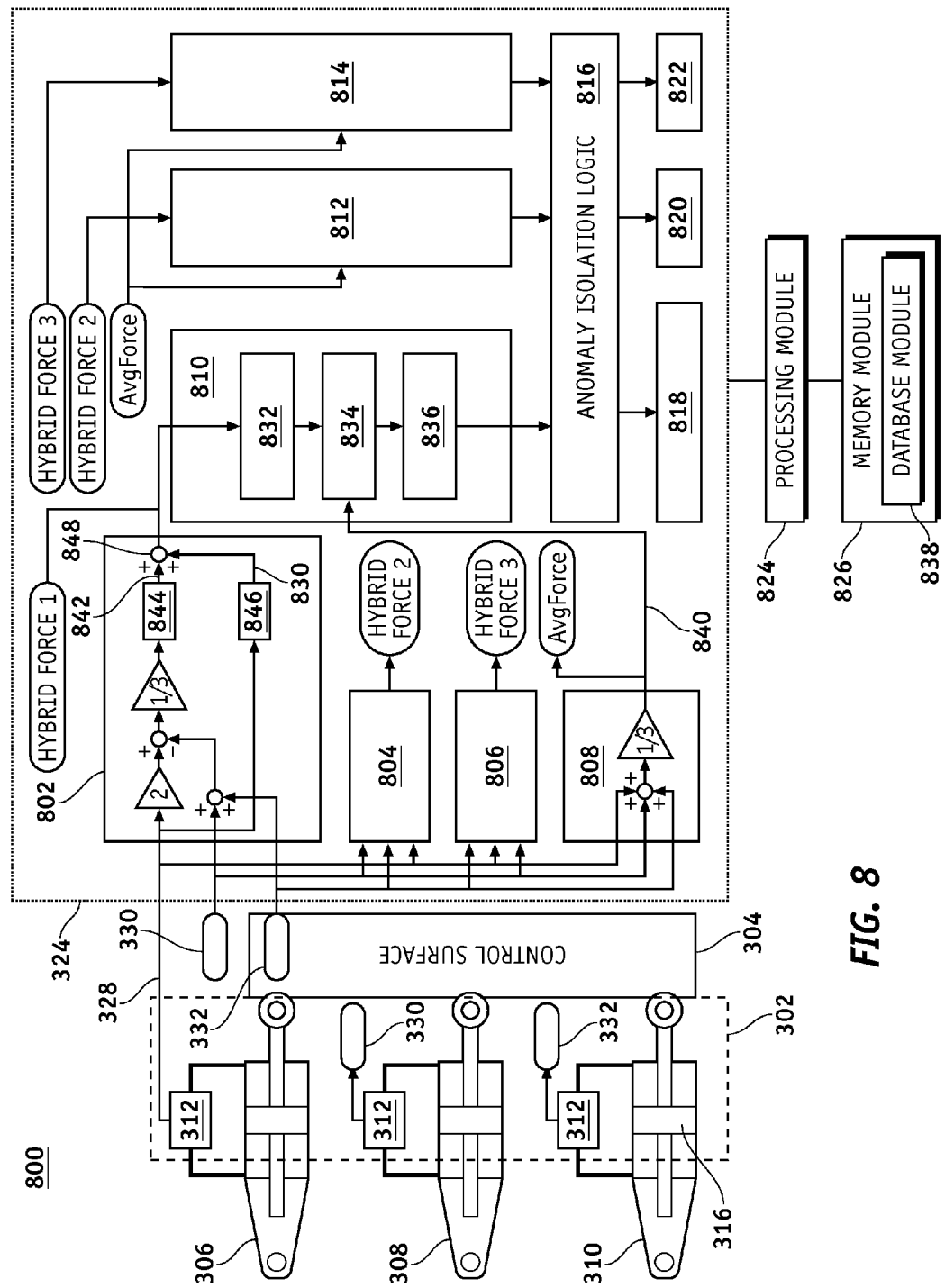
FIG. 8 is an illustration of a fatigue monitoring system showing the system of FIG. 3 in more detail according to an embodiment of the disclosure.

FIG. 8 is an illustration of fatigue monitoring system 800 (system 800) showing the system 300 of FIG. 3 in more detail according to an embodiment of the disclosure. The various illustrative blocks, modules, processing logic, and circuits described in connection with system 800 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein.

The system 800 may have functions, material, and structures that are similar to the embodiments shown in FIG. 3. Therefore common features, functions, and elements may not be redundantly described here.

The system 800 generally comprises the subsystem 302, the control surface 304, and the control module 324. The system 800 may have functions, material, and structures that are similar to the embodiments shown in FIG. 3. Therefore common features, functions, and elements may not be redundantly described here. While the system 800 is applicable to a wide range of subsystems and modules of a primary aircraft flight control system, an exemplary system 800 is schematically illustrated in FIG. 8.

The subsystem 302 is explained above in the context of the discussion of FIG. 3.

The control module 324, may comprise a first hybrid force computation module 802, a second hybrid force computation module 804, a third hybrid force computation module 806, an air load computation module 808, a first fatigue anomaly rate monitoring module 810, a second fatigue anomaly rate monitoring module 812, a third fatigue anomaly rate monitoring module 814, an anomaly isolation logic module 816, a first actuator shutdown module 818, a second actuator shutdown module 820, a third actuator shutdown module 822, a processor module 824, and a memory module 826.

The control module 324 may comprise, for example but without limitation, a desktop, a laptop or notebook computer, a hand-held computing device (PDA, cell phone, palmtop, etc.), a mainframe, a server, a client, or any other type of special or general purpose computing device as may be desirable or appropriate for a given application or environment. For some application, the control module 324 may reside at least partially in a high-integrity computing system to provide a redundant cross-checking, since it can shutdown devices such as flight control actuator/surface.

The control module 324, may comprise any number of hybrid force computation modules, any number of air load computation modules, any number of fatigue anomaly rate monitoring modules, any number of anomaly isolation logics, any number of actuator shutdown modules, any number of processor modules, any number of memory modules, or any number of other modules suitable for operation of the system 800.

The differential pressure across the cylindrical pistons 316 is monitored and measured by the force sensor 312, and the difference between a differential pressure of one actuator and another at any given point in time is also measured. Devices for controlling an orientation of the control surface 304 are generally electrically linked to control electronics. Thus, the actuators 306/308/310 are each electrically linked to respective actuator control electronics (not shown); and operated in concert with each other. The actuator control electronics periodically monitor the differential pressure across actuators 306/308/310, respectively, and transmit signals representative of the differential pressure to the control module 324.

Each hybrid force computation module 802/804/806 is operable to calculate a receptive hybrid force 1/hybrid force 2/hybrid force 3 by using a sum 848 of a low-pass filter 844 output 842 of the force fight (between force 1 (328), force 2 (330) and force 3 (332)) and a high-pass filter 846 output 830 of the force 1 (328). In this manner, the hybrid force computation module 802/804/806 calculates receptive hybrid force 1/hybrid force 2/hybrid force 3 induced by at least two actuators based on a force fight of the at least two actuators and based on a monitored actuator force from among the at least two measured actuator forces.

The air load computation module 808 is operable to estimate an air load of the at least two actuators from among the actuators 306/308/310 based on the at least two measured actuator forces. The air load computation module 808 calculates the air load, and sends an air load signal 840 to the fatigue anomaly rate monitoring module 810/812/814.

Each fatigue anomaly rate monitoring module 810/812/814 calculates a mean value such as the mean 406 and a range value such as the range 404 of actuators force cycles, and a real-time localized fatigue of the control surface 304 at each actuator based on the fighting forces, the range 404, and the mean 406 of the actuators force cycles. Each fatigue anomaly rate monitoring module 810/812/814 comprises a local minimum and maximum detection module 832, a fatigue anomaly calculation module 834, and a trip monitor module 836.

The local minimum and maximum detection module 832 is operable to determine local maxima and minima of the force cycles. A determination of these local maxima and minima is significant because fatigue anomaly increases exponentially with a magnitude of load reversals. Therefore, it is useful to differentiate between large load reversals and a series of several smaller reversals. Process of local maxima and minima detection of the local minimum and maximum detection module 832 is described in more detail in the context of discussion of FIGS. 10 and 16.

The fatigue anomaly calculation module 834 is operable to calculate a fatigue anomaly based on appropriate fatigue anomaly equations found in standard engineering textbooks, such as Shigley & Mitchell, Mechanical Engineering Design, McGraw Hill Series in Mechanical Engineering, Fourth Edition. In general, fatigue anomaly is a function of the following parameters: material of construction of structure; geometry (length, width, cross-sectional area, etc.); stress concentration (hole, thread, fillet, etc.); mean load (½ (maximum load+ minimum load)); and alternating load (½ (maximum load- minimum load)). Fatigue anomaly from each cycle may be summed using Miner's rule, which is also set forth in standard engineering texts.

The trip monitor module 836 monitors action based on a rate of change of anomaly. Predetermined magnitudes are set for rate of change of anomaly for predetermined intervals for which such rates are calculated. If the rate of calculated anomaly exceeds the predetermined magnitude (fatigue increment threshold) in the predetermined interval, appropriate action is initiated. Operation of the trip monitor module 836 is explained in more detail in the context of discussion of FIGS. 12 and 15.

The anomaly isolation logic module 816 is operable to determine a fatigue anomaly based on the hybrid force and the air load and detect an non-optimal actuator. The anomaly isolation logic module 816 computes the fatigue for all active actuators and determine if a fatigue increment changed by more than the fatigue increment threshold during a monitoring window. The anomaly isolation logic module 816 further determines if the fatigue increment threshold is exceeded for more than one actuator and determines if any of the actuators with exceeded fatigue increment threshold is a higher priority according to a predetermined hierarchy. The fault isolation logic module 816 then determines which actuators are active and which actuators are not active, and decides which actuator is the non-optimal actuator. A anomaly isolation logic process is explained in more detail in the context of discussion of FIG. 12.

The actuator shutdown module 818/820/822 is operable to shut down the non-optimal actuator among the actuators based on a signal received from the anomaly isolation logic module 816. An action indicated by the signal may vary depending upon a degree of an estimated fatigue anomaly. For instance, if the fatigue anomaly estimated is of a significant nature, the actuator shutdown module 818/820/822 shuts down the non-optimal actuator.

The processor module 824 comprises processing logic that is configured to carry out the functions, techniques, and processing tasks associated with the operation of the system 800. In particular, the processing logic is configured to support the system 800 described herein.

A processor may be realized as a microprocessor, a controller, a microcontroller, a state machine, and the like. A processor may also be implemented as a combination of computing devices, e.g., a combination of a digital signal processor and a microprocessor, a plurality of microprocessors, one or more microprocessors in conjunction with a digital signal processor core, or any other such configuration.

The processor module 824 also accesses data stored in various databases such as a database module 828 of the memory module 826, to support functions of the system 800. The processor module 824 enables monitoring the system 800 and deactivating a non-optimal actuator in the aircraft 200 in response to detecting the non-optimal actuator.

The processor module 824 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein.

In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

The memory module 826 may be a data storage area with memory formatted to support the operation of the system 800. The memory module 826 is configured to store, maintain, and provide data as needed to support the functionality of the system 800 in the manner described below. In practical embodiments, the memory module 826 may comprise, for example but without limitation, a non-volatile storage device (non-volatile semiconductor memory, hard disk device, optical disk device, and the like), a random access storage device (for example, SRAM, DRAM), or any other form of storage medium known in the art. The memory module 826 may be coupled to the processor module 824 and configured to store the data mentioned above.

The memory module 826 may comprise the database module 838. The database module 838 may comprise a fatigue history of the calculated localized fatigue information developed during a flight time. The database history of the calculated localized fatigue information may comprise data information gathered in a discrete time period or gathered in a continuous flight time period during the flight time. The processor module 824 may compare the real-time calculated localized fatigue information with the corresponding fatigue history.

Additionally, the memory module 826 may represent a dynamically updating database containing a table for updating various databases. The memory module 826 may also store, the data mentioned above, a computer program that is executed by the processor module 824, an operating system, an application program, tentative data used in executing a program, and the like.

The memory module 826 may be coupled to the processor module 824 such that the processor module 824 can read information from and write information to the memory module 826. As an example, the processor module 824 and memory module 826 may reside in respective application specific integrated circuits (ASICs). The memory module 826 may also be integrated into the processor module 824. In an embodiment, the memory module 826 may comprise a cache memory for storing temporary variables or other intermediate information during execution of instructions to be executed by the processor module 824.

Figure 9:
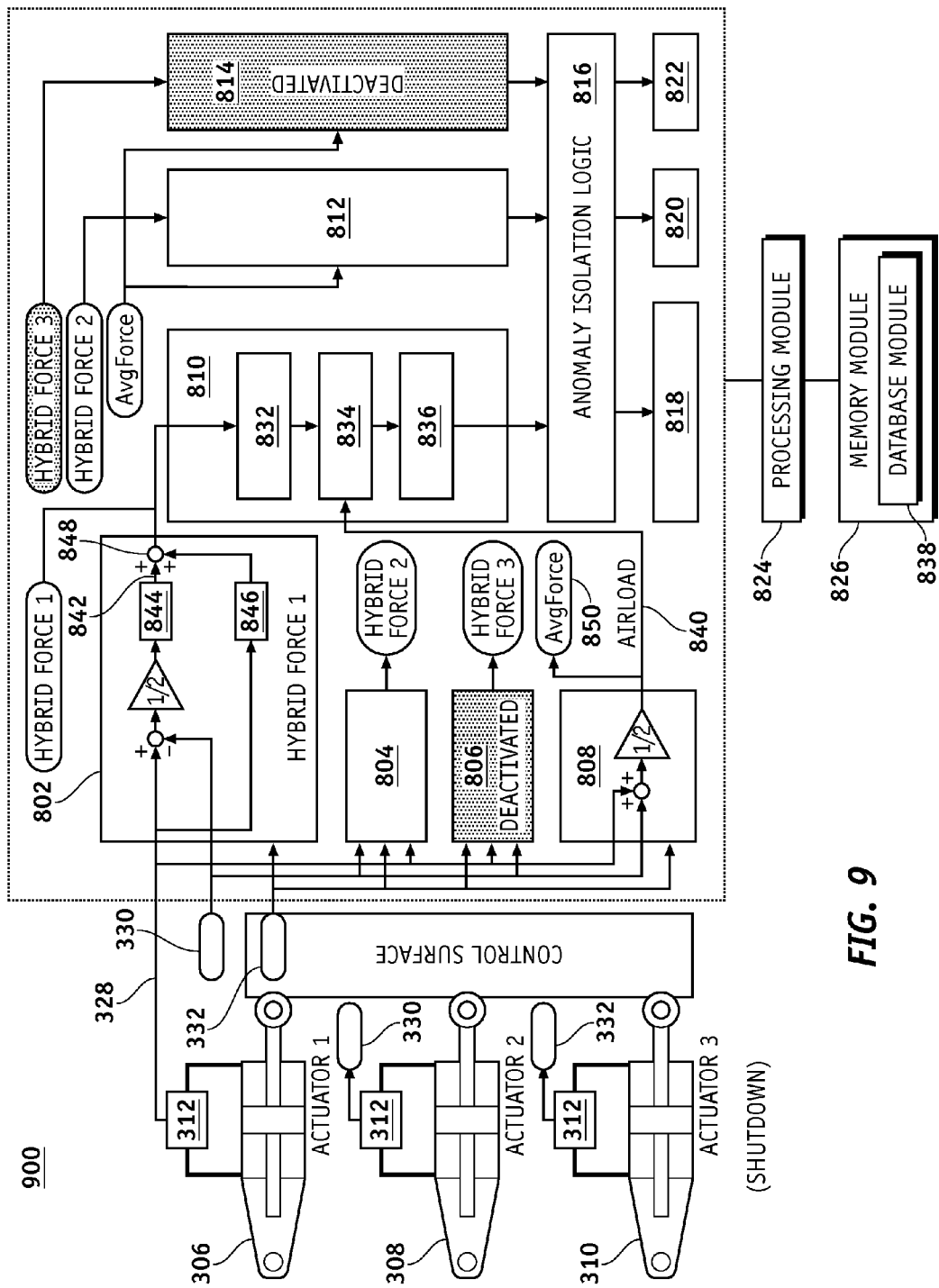
FIG. 9 is an illustration of a fatigue monitoring system with two-actuator configuration showing a third actuator shutdown according to an embodiment of the disclosure.

FIG. 9 is an illustration of fatigue monitoring system 900 with two-actuator configuration showing a third actuator has been shut down. System 900 may have functions, material, and structures that are similar to the embodiments shown in FIG. 8. Therefore common features, functions, and elements may not be redundantly described here.

The system 900 receives three measured actuator forces 328/330/332 from the three actuators 306/308/310 respectively, and deactivates the monitored actuator 310 among the three actuators 306/308/310 if the fatigue anomaly exceeds the fatigue increment threshold. The monitored actuator force is from the monitored actuator 310. FIG. 9 shows that the actuator 310 (actuator 3) is shut down, and the hybrid force computation module 806 and the fatigue anomaly rate monitoring module 814 are deactivated accordingly.

Figure 10:
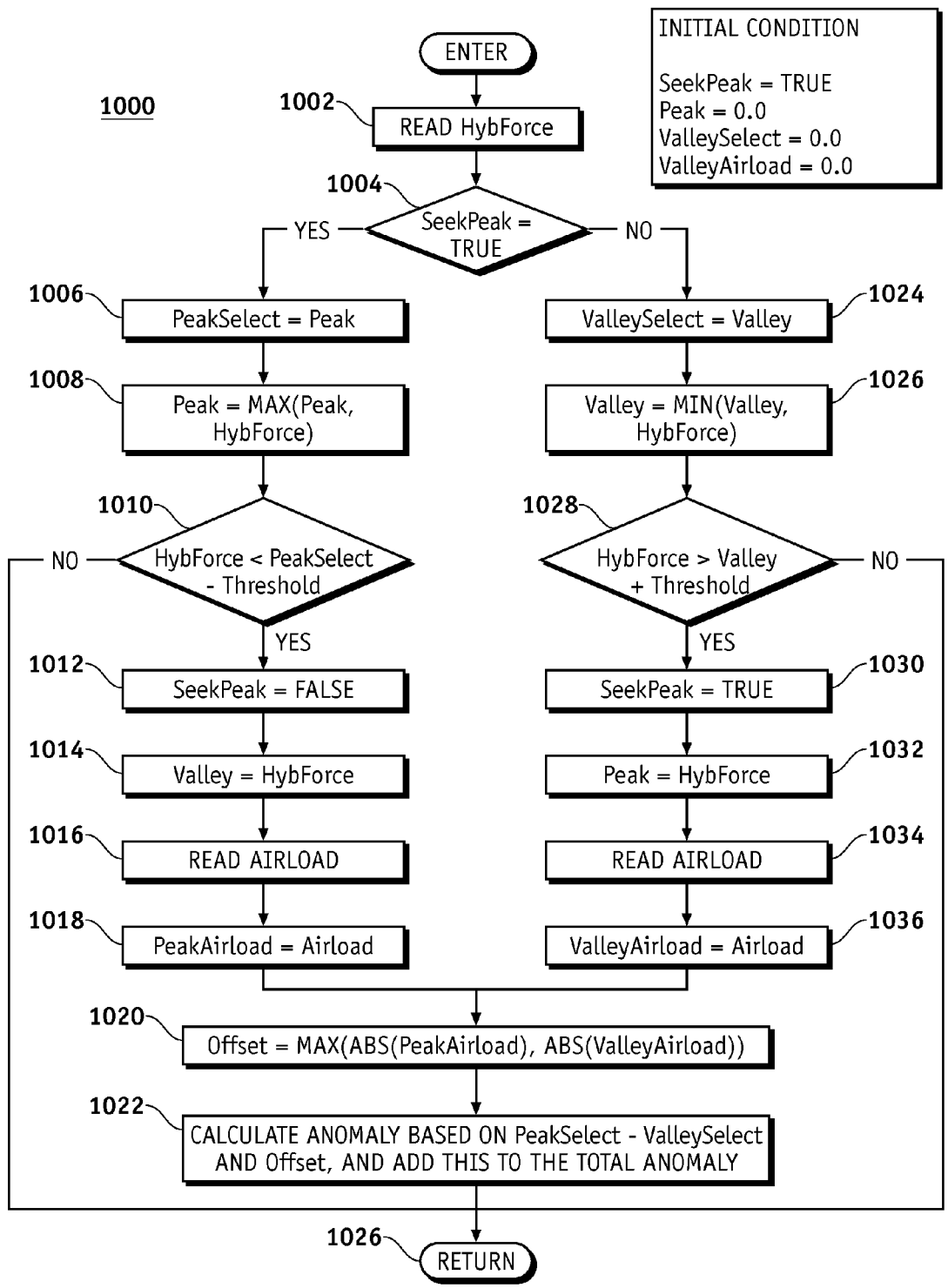
FIG. 10 is an illustration of an exemplary flowchart showing a process for local minimum and maximum detection and fatigue anomaly calculation with air load contribution according to an embodiment of the disclosure.

FIG. 10 is an illustration of an exemplary flowchart showing a process 1000 for local minimum and maximum detection and fatigue anomaly calculation with air load contribution according to an embodiment of the disclosure. FIG. 10 shows how the fatigue anomaly rate monitoring module 810 is used. Process 1000 is shown from "Enter" to "Return" that is repeated at a regular execution interval (e.g., every 12.5 milliseconds, or 80 HZ).

Figure 11:
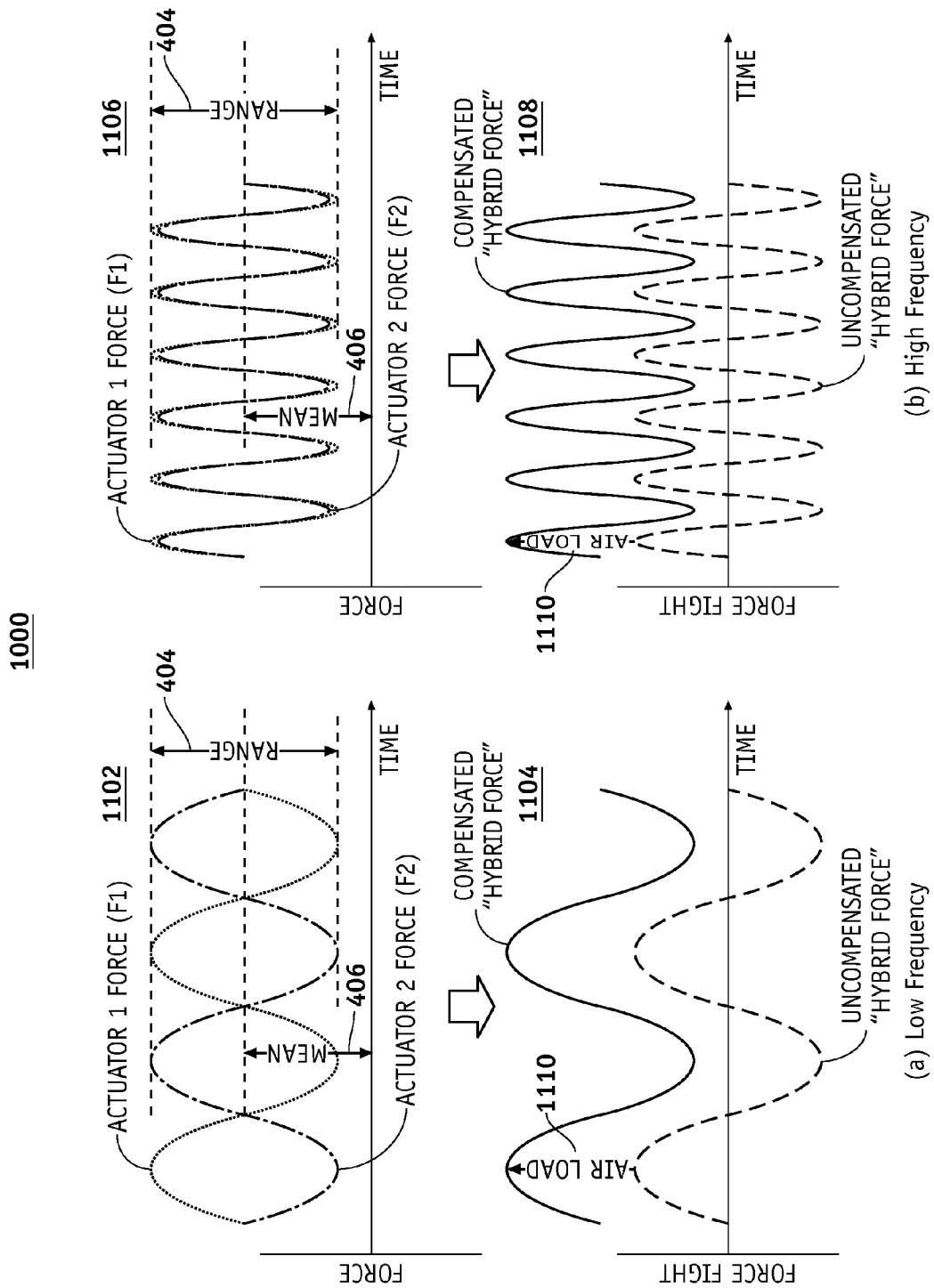
FIG. 11 is an illustration of an offset compensation according to an embodiment of the disclosure.

FIG. 11 is an illustration of offset compensation according to an embodiment of the disclosure. FIG. 10 is described below with connection to FIG. 11.

The various tasks performed in connection with process 1000 may be performed mechanically, by software, hardware, firmware, a computer-readable medium having computer executable instructions for performing the process method, or any combination thereof. It should be appreciated that process 1000 may include any number of additional or alternative tasks, the tasks shown in FIG. 8 need not be performed in the illustrated order, and process 800 may be incorporated into a more comprehensive procedure or process having additional functionality not described in detail herein.

For illustrative purposes, the following description of process 1000 may refer to elements mentioned above in connection with FIGS. 3-9. In practical embodiments, portions of the process 800 may be performed by different elements of the system 800-900 such as: each of the hybrid force computation module 802/804/806, the air load computation module 808, each of the fatigue anomaly rate monitoring module 810/812/814, the anomaly isolation logic module 816, the actuator shutdown module 818/820/822, the processor module 824, and the memory module 826. Process 1000 may have functions, material, and structures that are similar to the embodiments shown in FIGS. 3, 8, and 9. Therefore common features, functions, and elements may not be redundantly described here.

Process 1000 may begin by reading the hybrid force "HybForce" (task 1002).

Process 1000 may continue by determining whether the SeekPeak="TRUE") (inquiry task 1004).

While the process 1000 is seeking the Peak (SeekPeak="TRUE") in the inquiry task 1004, process 1000 updates the Peak by the MAX(Peak, HybForce) (task 1008) each time the HybForce exceeds a current Peak. In conjunction to this, PeakSelect is set to the Peak (task 1006) from a previous iteration. This continues until the process 1000 finds the Peak, which is indicated by the HybForce coming off the PeakSelect by the threshold (inquiry task 1010). When this occurs, the fatigue anomaly associated with a most recent ValleySelect-to-PeakSelect half-cycle is computed and added to the total fatigue anomaly value (task 1022). Unlike existing systems, in addition to PeakSelect-ValleySelect (i.e., the "range" 404), the process 1000 also uses Offset (i.e. the "mean" 406) to calculate the fatigue.

The process 1000 shows the offset being set to a greater of the absolute values (ABS) of the PeakAirload and the ValleyAirload (task 1020), when the PeakAirload (task 1018) and the ValleyAirload (task 1036) are detected but it can also be substituted with a variety of other methods. After the fatigue associated with this cycle is added to the total fatigue anomaly in the task 1022, the process 1000 proceeds to the task 1012 to seek the next Valley (SeekPeak="FALSE"). At the start of this phase, ValleySelect is initialized to the HybForce (task 1014) from the previous iteration.

This is so that if the HybForce that was read in the previous iteration was the valley, this would not be discarded. In the valley-seeking phase, the process 1000 updates the Valley by MIN(Valley, HybForce) (task 1026) each time the HybForce is below a current Valley. In conjunction to this, the ValleySelect is set to the Valley (task 1024) from a previous iteration. This continues until the Valley is found, which is indicated by the HybForce coming up from the ValleySelect by the threshold (inquiry task 1028). When this occurs, the fatigue anomaly associated with the most recent PeakSelect-to-ValleySelect (half cycle 402 in FIG. 4) is computed and added to the total fatigue anomaly value (task 1022). In this document MAX means substantially maximum and MIN means substantially minimum.

As mentioned above, the process 1000 uses the PeakSelect-ValleySelect (i.e., the "range" 404) and the Offset (i.e., the "mean" 406). The process 1000 then returns (task 1026) to seek for a next Peak (SeekPeak="TRUE") (inquiry task 1004). At a start of this phase, the PeakSelect is initialized to the HybForce (task 1008) from the previous iteration. This is so that if the HybForce that was read in the previous iteration was the Peak, this would not be discarded. This process continues in this manner for an entire operation such as a flight. Initial condition may be set for the SeekPeak=TRUE, Peak=0, VallySelect=0, and VallyAirload=0. However, other initial conditions may also be used.

Figure 12:
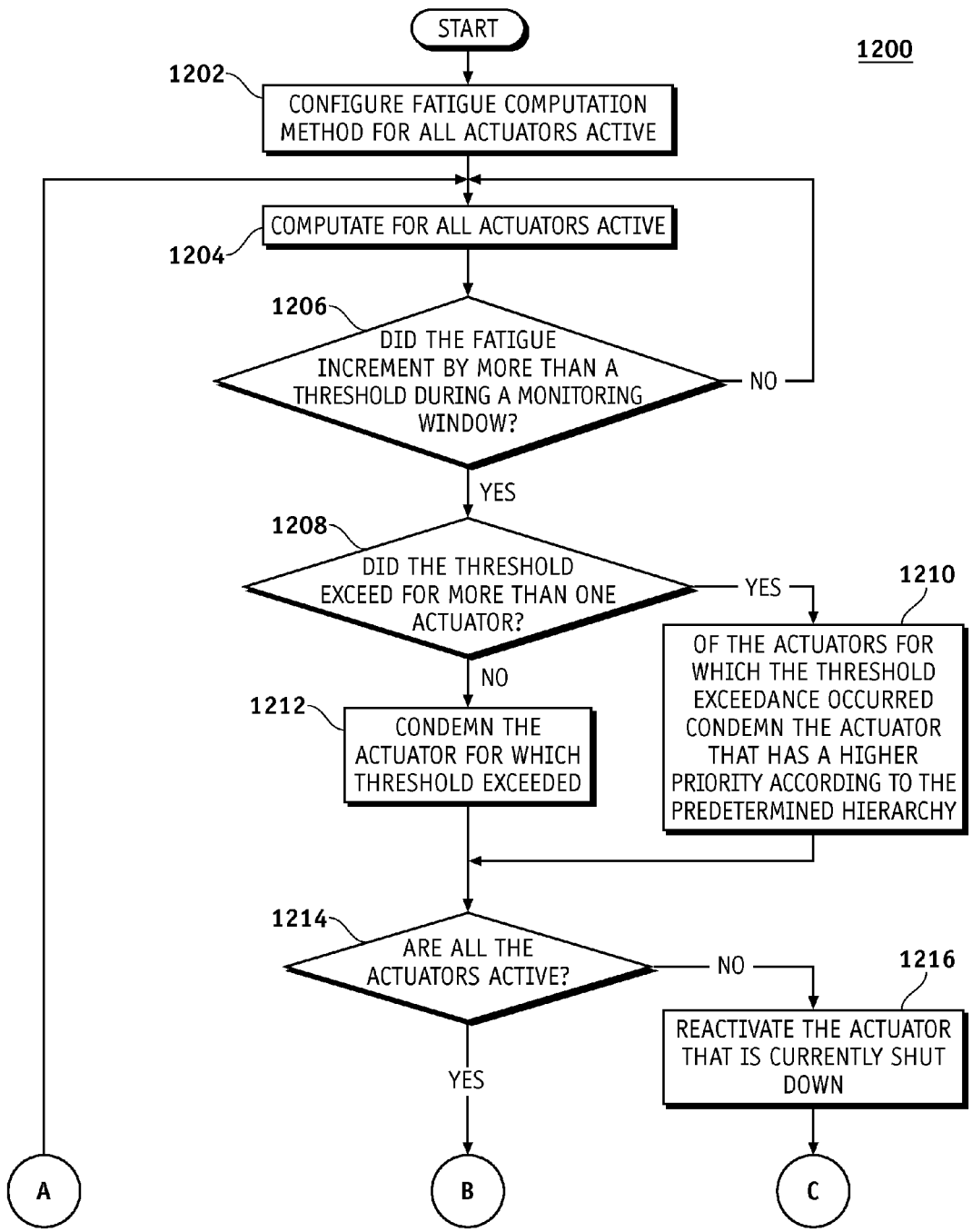
FIG. 12 is an illustration of an exemplary flowchart showing a process for anomaly isolation that can be performed by an anomaly isolation logic according to an embodiment of the disclosure.
Figure 12:
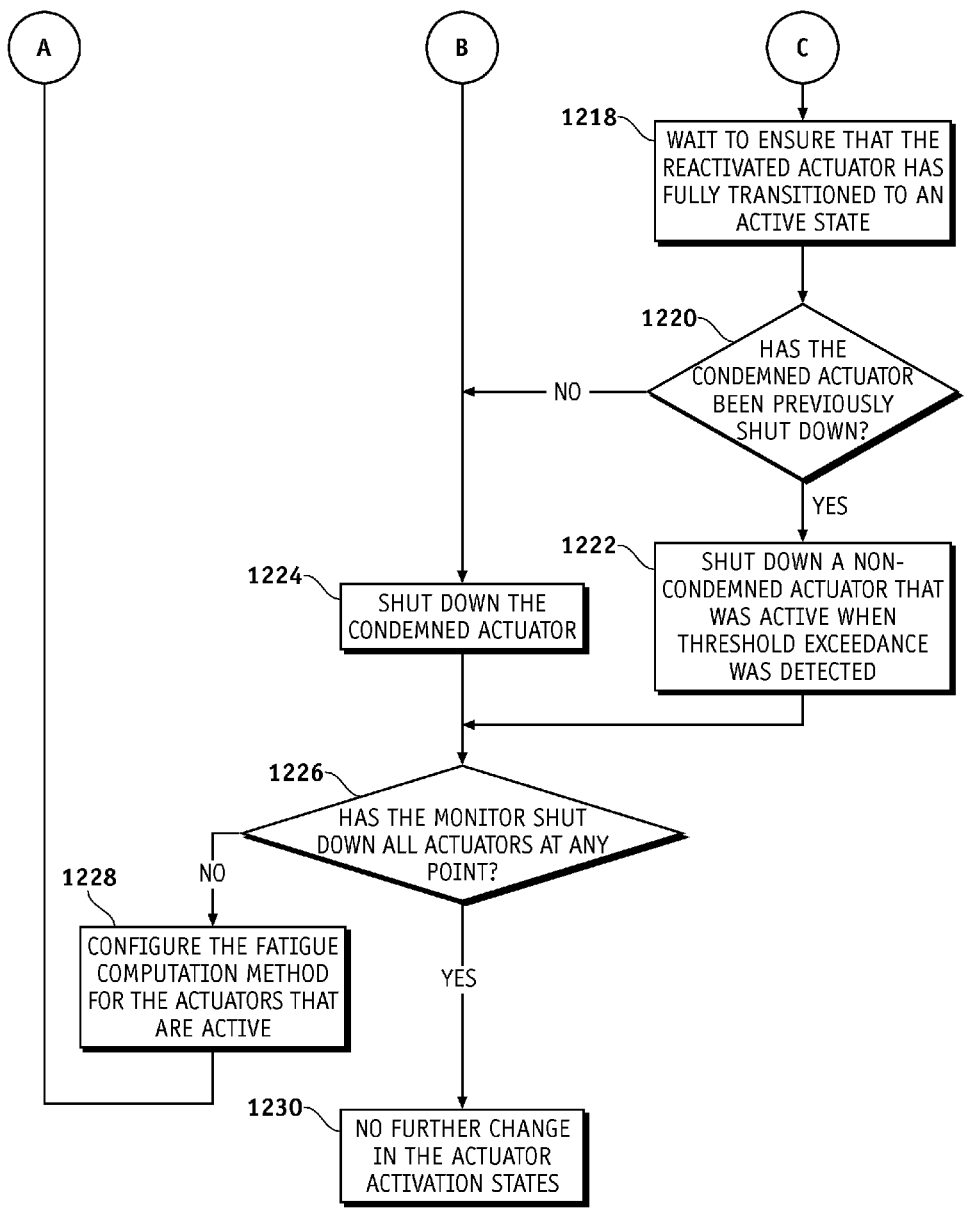
Figure 13:
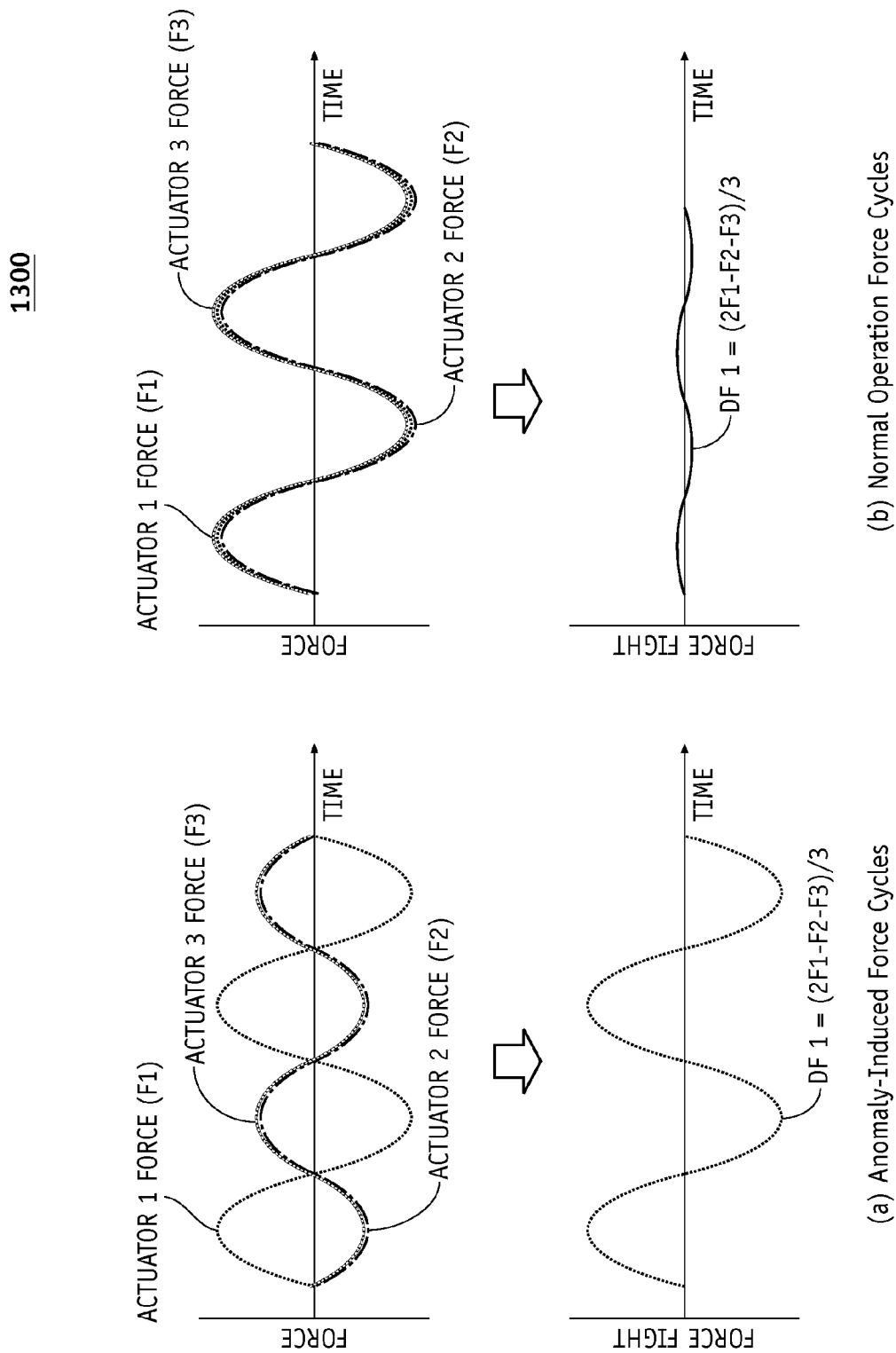
FIG. 13 is an illustration of distinction between anomaly-induced and normal force cycles with three actuators.
Figure 14:
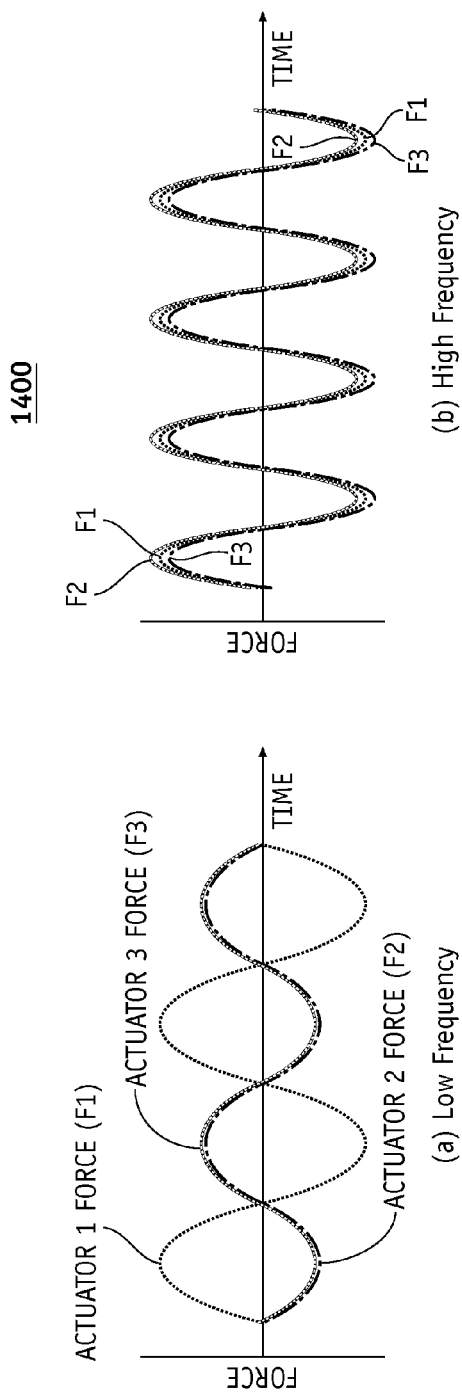
FIG. 14 is an illustration of force cycles at low and high frequencies showing difficulty with using an existing monitoring system at high frequency.
Figure 15:
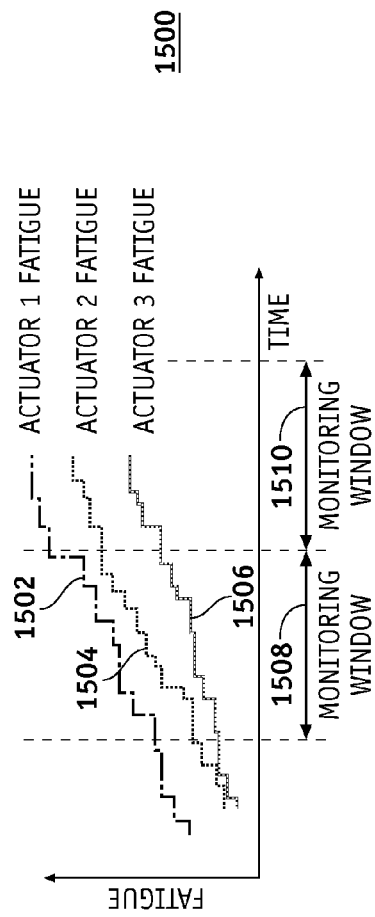
FIG. 15 is a graph showing an exemplary fatigue monitoring window according to an embodiment of the disclosure.

FIG. 12 is an illustration of an exemplary flowchart showing a process 1200 for anomaly isolation that can be performed by the anomaly isolation logic module 816 of the systems 800-900 according to an embodiment of the disclosure. FIG. 13 is an illustration of distinction between anomaly-induced and normal force cycles with three actuators. FIG. 14 shows difficulty with using an existing monitoring system at a high frequency. FIG. 15 is a graph of an exemplary fatigue vs. time plots 1502, 1504, and 1506 for actuator 1, actuator 2, and actuator 3 respectably showing monitoring windows 1508/1510 according to an embodiment of the disclosure. FIG. 12 is described below with connection to FIGS. 13, 14, and 15.

The various tasks performed in connection with process 1200 may be performed mechanically, by software, hardware, firmware, a computer-readable medium having computer executable instructions for performing the process method, or any combination thereof. It should be appreciated that process 1200 may include any number of additional or alternative tasks, the tasks shown in FIG. 12 need not be performed in the illustrated order, and process 1200 may be incorporated into a more comprehensive procedure or process having additional functionality not described in detail herein.

For illustrative purposes, the following description of process 1200 may refer to elements mentioned above in connection with FIGS. 3-9. In practical embodiments, portions of the process 1200 may be performed by different elements of the system 800-900 such as: each of the hybrid force computation module 802/804/806, the air load computation module 808, each of the fatigue anomaly rate monitoring module 810/812/814, the anomaly isolation logic module 816, the actuator shutdown module 818/820/822, the processor module 824, and the memory module 826. Process 1200 may have functions, material, and structures that are similar to the embodiments shown in FIGS. 3, 8, 9, and 10. Therefore common features, functions, and elements may not be redundantly described here.

In order to expand its applicability to surfaces controlled by more than two actuators, the system 800 must be able to identify the non-optimal actuator. This is primarily because one of the main motivations for providing three actuators to control a surface is that being able to control its deflection is considered significant in order to continue to fly and land substantially optimally. As shown in FIG. 13, the force fight of an actuator can be derived by doubling its force output and subtracting the force outputs of the other two actuators, and dividing a result by a third (i.e., $DF1=(2F1-F2-F3)/3$).

For example, DF1 may be computed by subtracting air load (e.g., an average of three forces) from an individual force, e.g., $DF1=F1-(F1+F2+F3)/3=(2F1-F2-F3)/3$. This is based on an assertion that a force output of a non-optimal actuator is opposed by two other actuators carrying equal loads. For example, if a non-optimal actuator is oscillating with an amplitude of +/−5000 lbs and that it's being opposed by two actuators each with an amplitude of +/−2500 lbs (but 180 deg out of phase). A peak, F1 (F_bad)=5000 lbs, F2 (F_good1)=−2500 lbs, and F3 (F_good2)=−2500 lbs. Therefore $DF (F\_bad)=(2*F\_bad-F\_good1-F\_good2)/3=[2*5000-(-2500)-(-2500)]/3$ which is equal 5000 lbs. In this manner, three or more actuators can be used to calculate DF.

While embodiments described herein indicate fundamental principles of derivation, an actual mechanization may require slight adjustments of parameters (e.g., gains such as "double", "one third") to compensate for implementation details, including the effects of sensor tolerances and discretization. As it can be seen in the FIG. 13, a resulting force fight cycle accurately recreates an original force cycle. As also shown in FIG. 13, determining a non-optimal actuator may be more difficult when the three actuators are working in unison. By computing fatigue for each of the three actuators and shutting down only an actuator that exceeds the threshold first, the control surface 304 can remain functionally controlled by two actuators.

As shown in FIG. 14, at high frequencies, discerning the non-optimal actuator from force characteristics alone becomes difficult. Further, as discussed above for two-actuator monitoring, asynchronicity between a sampling of force data from the multiple actuators also contributes to difficulty discerning the non-optimal actuator from force characteristics.

Since the system 800 described herein needs to correctly identify the non-optimal actuator in order to keep a surface functional, high-frequency phenomena pose a new technical challenge and requires a new approach. A difficulty arises with when an anomaly oscillation is a high frequency oscillation, particularly if the anomaly oscillation frequency is near a surface resonance of a surface such as the control surface 304. As seen with two actuator surfaces, the output forces of the actuators may come in phase and become very similar in amplitude, as shown in FIG. 14. In some cases, the non-optimal actuator may even exhibit significantly smaller force amplitude than the other actuators. Therefore, it becomes very difficult to discern the non-optimal actuator from the force characteristics alone.

The system 800 takes advantage of the fact that there are two active actuators on the control surface 304, even after one is shut down. This means that even if the process 1200 may incorrectly identify a non-non-optimal actuator initially and shuts it down, there is one actuator preventing the non-optimal actuator from taking sole control of the control surface 304.

Process 1200 may begin by configuring a fatigue computation for all three actuators being active (task 1202).

Process 1200 may then continue by computing the fatigue for all actuators (task 1204).

Process 1200 may then continue by determining whether the fatigue increment during a monitoring window (e.g., 200 seconds) exceeds a fatigue increment threshold (e.g., the system 800 trips) (inquiry task 1206) to provide fatigue increment threshold exceeded actuators. YES branch of inquiry task 1206 indicates a fatigue increment event if a fatigue increment changed by more than a fatigue increment threshold during the monitoring window.

If the fatigue increment exceeds the fatigue increment threshold (YES branch of inquiry task 1208), among the fatigue increment threshold exceeded actuators for which the threshold simultaneously exceeded, the process 1200 condemns the actuator that is a high priority actuator according to a predetermined hierarchy (task 1210) indicating a priority event. For example, the condemned actuator may be an "upper actuator" before a "middle actuator" before a "lower actuator". Since all actuators are still active, the actuator that has been condemned is shut down. However, if the process 1200 determines that only one actuator exceeded the fatigue increment threshold (NO branch of the inquiry task 1208), process 1200 condemns the actuator for which threshold exceeded (task 1212).

The process 1200 may then determine whether all actuators are active (inquiry task 1214). If all the actuators are active (YES branch of inquiry task 1214), process 1200 shuts down the condemned actuator (task 1224).

The process 1200 then determines whether all the actuators have been shut down at any point (inquiry task 1226). If the actuators have been shut down at any point (YES branch of inquiry task 1226), then process 1200 does not change the actuator activation state (task 1230).

However, if the actuators have not been shut down at any point (NO branch of inquiry task 1226), then process 1200 configures the fatigue computation for the actuators that are active (task 1228). Process 1200 then leads back to the task 1204.

In the inquiry task 1214, however, if it is determined that all the actuators are not active (No branch of inquiry task 1214), process 1200 activates the actuator that is currently shut down (task 1216).

Process 1200 may then continue by waiting to ensure that the reactivated actuator has fully transitioned to the active state (task 1218).

Process 1200 may then continue by determining whether the system 800-900 has previously shut down the condemned actuator (inquiry task 1220). If it is determined that the system 800 has previously shut down the condemned actuator (YES branch of inquiry task 1220), the process 1200 shuts down the non-condemned actuator that was active when an exceeded threshold was detected (task 1222). Process 1200 may then lead to the inquiry task 1226 explained above.

In this manner, the process 1200 is reconfigured for detecting force fight induced fatigue between the two active actuators, as shown in FIG. 9. As discussed above, it is possible for the system 800 to have shut down a non-non-optimal actuator (an optimal actuator). In this case, the non-optimal actuator remains active and continues to misbehave, and the system 800 would trip again. If this occurs and if the system 800 tripped for one actuator, then the system 800 condemns the one actuator.

However, if the system 800 tripped for two actuators simultaneously, the system 800 condemns the actuator according to the predetermined hierarchy as before. It is known to the system 800 at this point that rapid accumulation of fatigue continued in the absence of the shutdown actuator, and so, a deduction can be made that it cannot be the non-optimal actuator. Therefore, it is "exonerated" and can be reactivated. This must occur before shutting down the newly condemned actuator in order to prevent the non-optimal actuator from gaining sole control of the surface, in case the monitor again erroneously condemned the non-non-optimal actuator. After a sufficient amount of time to ensure that the reactivated actuator has fully transition to the active state, the newly condemned actuator is shut down.

The system 800 again reconfigures for the two active actuators and follows the same routine. However, if the system 800 trips again, it is possible for the exonerated actuator be condemned again. Since it is already known by the system 800 that exonerated actuator is not the non-optimal actuator, the system 800 shuts down the other active actuator. At this point, all three actuators have been shut down once, and so, the process 1200 keeps this state for the remainder of the flight. In this way, a robust means of correctly identifying and shutting down the non-optimal actuator is provided.

Figure 16:
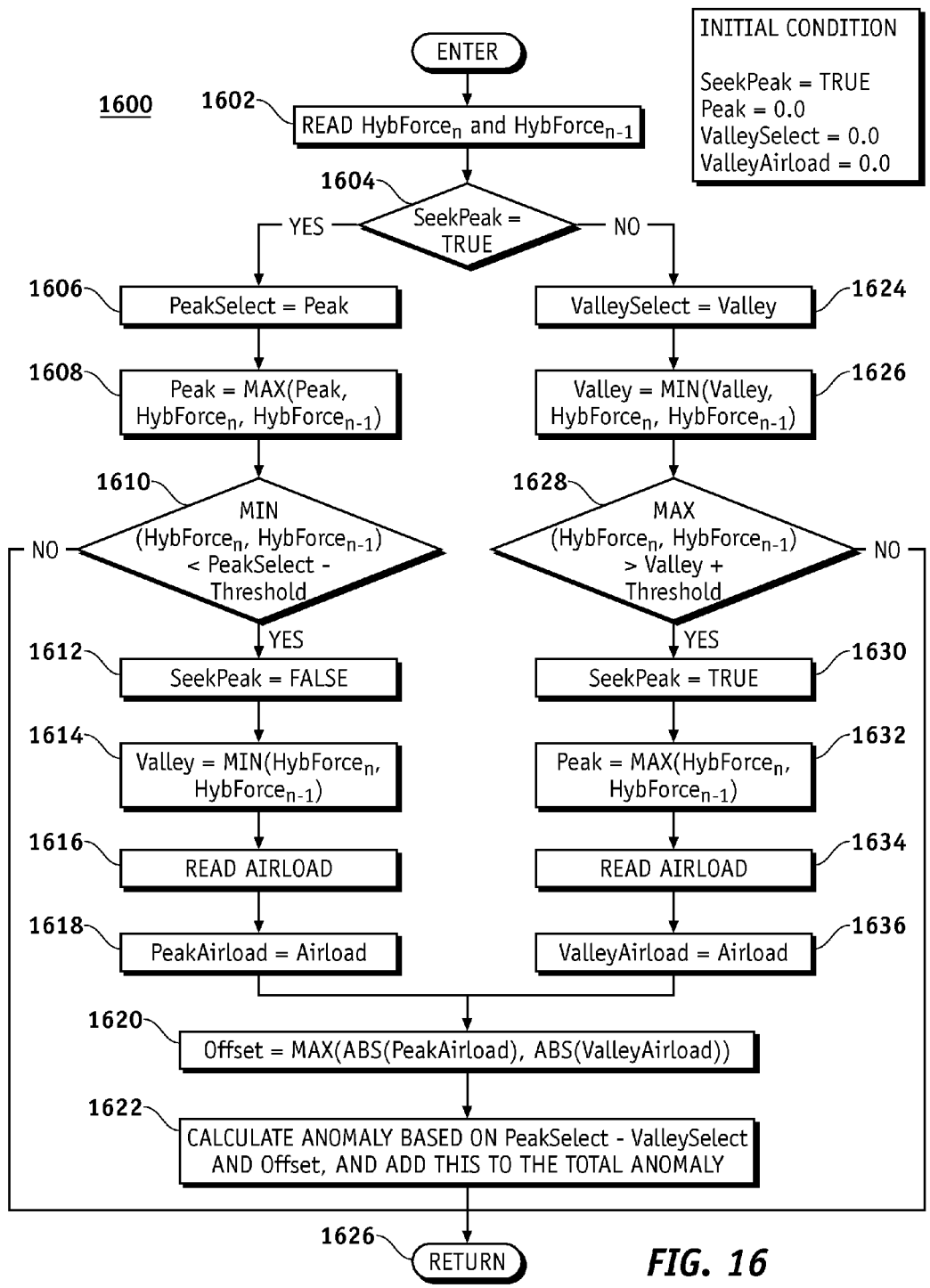
FIG. 16 is an illustration of an exemplary process for a local minimum and maximum detection and fatigue anomaly calculation with air load contribution and computational throughput reduction according to an embodiment of the disclosure.
Figure 17:
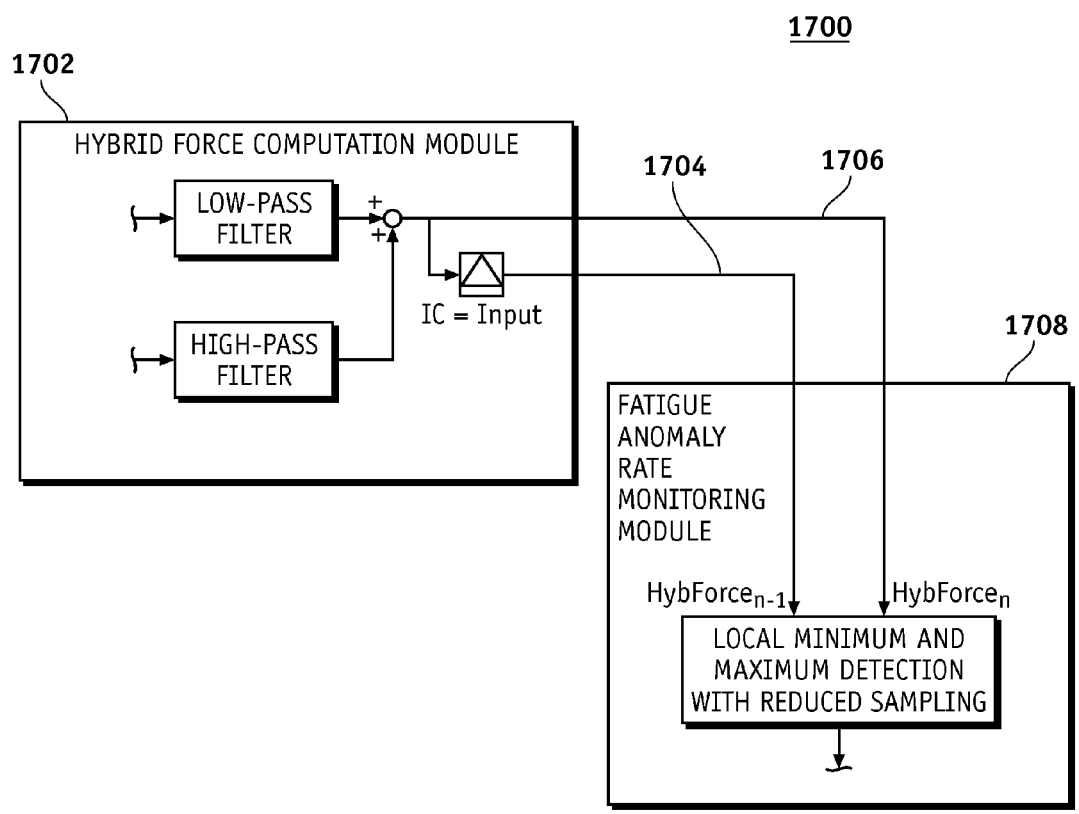
FIG. 17 is an illustration of an exemplary interface module for computational throughput reduction according to an embodiment of the disclosure.

FIG. 16 is an illustration a process 1600 for a local minimum and maximum detection and fatigue anomaly calculation with air load contribution and computational throughput reduction according to an embodiment of the disclosure. FIG. 17 is an illustration of an exemplary interface module 1700 for computational throughput reduction according to an embodiment of the disclosure. The process 1600 is described herein with connection to FIG. 17.

It is desirable to reduce the computational throughput while retaining the anomaly detection capability. To provide a reduced throughput, the system 800 provides an option of executing a large part of the anomaly monitoring functions at a reduced execution rate. The throughput reduction method is based on recognition that fatigue anomaly is a function of the peak and valley of force cycles, and as long as, the capability to capture these peak and valley is unaffected, the monitoring effectiveness would not degrade.

In the embodiment shown in FIG. 17, force sensor measurements are read and the hybrid forces are calculated at a full execution rate. This value is output for external consumption, and in parallel, it is retained to be output in a next iteration. Therefore, each time a hybrid force computation module 1702 in FIG. 17 (802-808 in FIG. 8) is executed, the hybrid force computation module 1702 outputs a most recent hybrid force HybForcen 1706 along with a previous hybrid force from the previous iteration HybForcen-1 1704. This allows the functions that consume the hybrid force to be executed at a half execution rate. One embodiment in which the two hybrid forces (HybForcen 1706, HybForcen-1 1704) are used in "local minimum and maximum detection" is shown in the process 1600.

The various tasks performed in connection with process 1600 may be performed mechanically, by software, hardware, firmware, a computer-readable medium having computer executable instructions for performing the process method, or any combination thereof. It should be appreciated that process 1600 may include any number of additional or alternative tasks, the tasks shown in FIG. 16 need not be performed in the illustrated order, and process 1600 may be incorporated into a more comprehensive procedure or process having additional functionality not described in detail herein.

For illustrative purposes, the following description of process 1600 may refer to elements mentioned above in connection with FIGS. 3-9. In practical embodiments, portions of the process 1600 may be performed by different elements of the systems 300 and 800 such as: each of the hybrid force computation module 802/804/806, the air load computation module 808, each of the fatigue anomaly rate monitoring module 810/812/814, the anomaly isolation logic module 816, the actuator shutdown module 818/820/822, the processor module 824, the memory module 826, and the interface module 1700. Process 1600 may have functions, material, and structures that are similar to the embodiments shown in FIGS. 3, 8, 9, and 10. Therefore common features, functions, and elements may not be redundantly described here.

This process 1600 indicates the process from "Enter" to "Return" that is repeated at a regular interval (e.g., about every 25 milliseconds, or about 40 HZ).

Process 1600 may begin by reading the HybForcen and HybForcen-1 (task 1602).

Process 1600 may continue by determining whether the SeekPeak="TRUE") ((inquiry task 1604).

While the process 1600 is seeking the Peak (SeekPeak="TRUE") in the inquiry task 1604, the process 1600 updates the Peak by a MAX(Peak, HybForcen, HybForcen-1) in the task 1608 each time the Peak exceeds a current Peak. In conjunction to this, the PeakSelect is set to the Peak (task 1606) from a previous iteration. This continues until the process 1600 finds the Peak, which is indicated by the MIN(HybForcen, HybForcen-1) coming off the PeakSelect by the threshold (inquiry task 1610). When this occurs, the fatigue anomaly associated with the most recent ValleySelect-to-PeakSelect half-cycle is computed and added to the total fatigue anomaly value (task 1622). Unlike existing systems, in addition to PeakSelect-ValleySelect (i.e., the "range" 404), the process 1600 also uses Offset (i.e. the "mean" 406) to calculate the fatigue as explained above.

The process 1600 shows the offset being set to the greater of the absolute values (ABS) of the PeakAirload and the VallyAirload (task 1620), when the PeakAirload (task 1618) and the ValleyAirload (task 1636) are detected but the offset can also be substituted with a variety of other methods. After the fatigue associated with this cycle is added to the total fatigue anomaly in the task 1622, the process 1600 proceeds to task 1612 to seek the next Valley (SeekPeak="FALSE"). At the start of this phase, ValleySelect is initialized to the MIN (HybForcen, HybForcen-1) (task 1614) from a previous iteration.

This is so that if the hybrid force that was read in the previous iteration was the Valley, this would not be discarded. In the valley-seeking phase, the process 1600 updates Valley by the MIN(Valley, HybForcen, HybForcen-1) (task 1626) each time it is below a current Valley. In conjunction to this, ValleySelect is set to the Valley (task 1624) from a previous iteration. This continues until the valley is found, which is indicated by the MAX(HybForcen, HybForcen-1) coming up from ValleySelect by the threshold (inquiry task 1628). When this occurs, the fatigue anomaly associated with the most recent PeakSelect-to-ValleySelect (half cycle 402 in FIG. 4) is computed and added to the total fatigue anomaly value (task 1622). After the fatigue associated with this cycle is added to the total fatigue anomaly in the task 1622, the process 1600 proceeds to task 1630 to seek the next Peak (SeekPeak="TRUE") (task 1630). At a start of this phase, PeakSelect is initialized to the MAX(HybForcen, HybForcen-1) (task 1632) from a previous iteration.

While the method of halving the execution rate by retaining one previous sample was described above, other method can be generalized to any number of samples, and thus, a further reduction is possible. This can be accomplished by increasing the number of past samples that are retained in hybrid force computation module 1702 and passed onto local minimum and maximum detection module 1708. Instead of applying the greater or the lesser of HybForcen and HybForcen-1, the more general method would apply the greatest or the smallest of (HybForcen, HybForcen-1 . . . HybForcen-N), where N is a number of past samples used.

While there is substantially no limit in terms of implementation, a degree to which reducing the throughput can be carried out without losing anomaly detection capability dependents on a base frame rate (e.g., the full execution rate) and a force cycle oscillation frequency. As previously pointed out, one of the bases for this throughput reduction method is that the peak and valley don't occur in the same set of hybrid force data sampled by the local minimum and maximum detection module.

Figure 18:
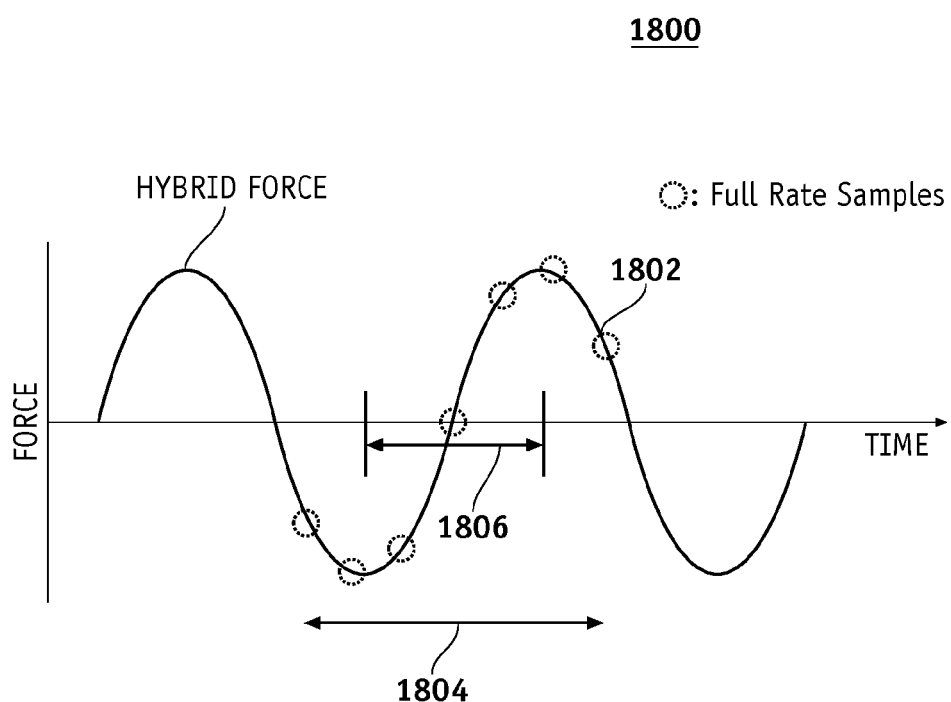
FIG. 18 is an illustration of an exemplary graph in which hybrid force cycles are sinusoidal showing how a throughput reduction method may be limited.

FIG. 18 is an illustration of a graph 1800 in which the hybrid force cycles are sinusoidal showing the throughput reduction method may be limited. As it can be seen in FIG. 18, if the period of time from which a set 1804 of hybrid force samples 1802 are taken exceeds half of the period 1806 of anomaly oscillation frequency, then it becomes possible for cycles to be lost because the peak and valley would occur in the same sample set.

Figure 19:
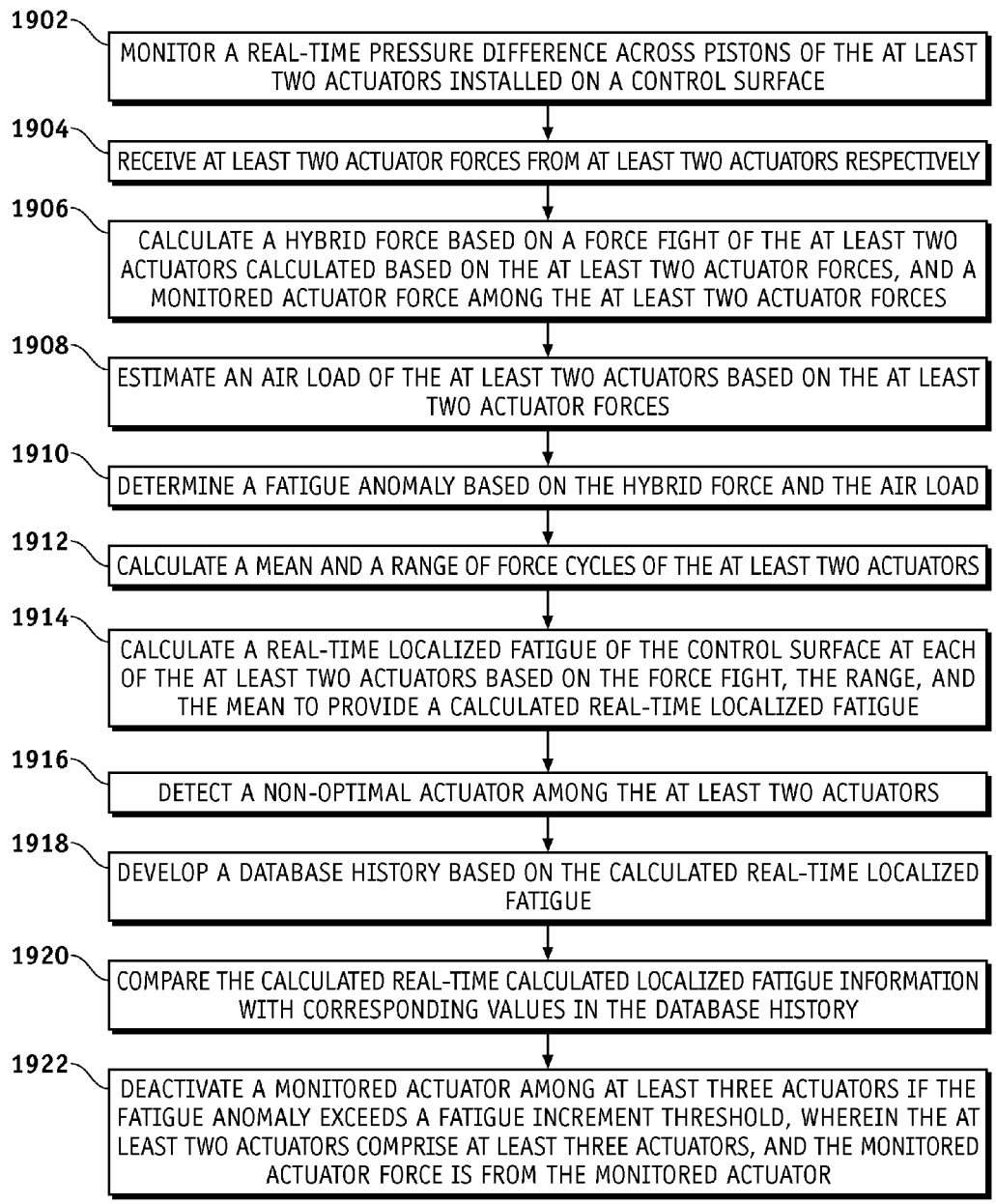
FIG. 19 is an illustration of an exemplary flowchart showing an actuator fatigue monitoring process according to an embodiment of the disclosure.

FIG. 19 is an illustration of an exemplary flowchart showing an actuator fatigue monitoring process 1900 that can be performed by the systems 800-900 according to an embodiment of the disclosure. The various tasks performed in connection with process 1900 may be performed mechanically, by software, hardware, firmware, a computer-readable medium having computer executable instructions for performing the process method, or any combination thereof. It should be appreciated that process 1900 may include any number of additional or alternative tasks, the tasks shown in FIG. 19 need not be performed in the illustrated order, and process 1900 may be incorporated into a more comprehensive procedure or process having additional functionality not described in detail herein.

For illustrative purposes, the following description of process 1900 may refer to elements mentioned above in connection with FIGS. 3-9. In practical embodiments, portions of the process 1900 may be performed by different elements of the system 800-900 such as: each of the hybrid force computation module 802/804/806, the air load computation module 808, each of the fatigue anomaly rate monitoring module 810/812/814, the anomaly isolation logic module 816, the actuator shutdown module 818/820/822, the processor module 824, and the memory module 826. Process 1200 may have functions, material, and structures that are similar to the embodiments shown in FIGS. 3-9. Therefore common features, functions, and elements may not be redundantly described here.

Process 1900 may begin by monitoring a real-time pressure difference across pistons of the at least two actuators installed on a control surface such as the control surface 304 (task 1902).

Process 1900 may begin by receiving at least two measured actuator forces from at least two actuators respectively (task 1904).

Process 1900 may continue by calculating a hybrid force based on a force fight of the at least two actuators calculated based on the at least two measured actuator forces, and a monitored actuator force among the at least two measured actuator forces (task 1906). The hybrid force comprises a sum of a low-pass filter of the force fight and a high-pass filter of the monitored actuator force. The hybrid force comprises the force fight below a frequency threshold and the monitored actuator force above the frequency threshold. The force fight comprises a sum of differences of each of the at least two measured actuator forces from an expected force. In other words, the force fight comprises a difference of the at least two measured actuator forces excluding the monitored actuator force subtracted from a multiple of the monitored actuator force.

Process 1900 may continue by estimating an air load of the at least two actuators based on the at least two measured actuator forces (task 1908). The air load comprises an average of the at least two measured actuator forces.

Process 1900 may continue by determining a fatigue anomaly based on the hybrid force and the air load (task 1910).

Process 1900 may continue by calculating a mean and a range of force cycles of the at least two actuators (task 1912).

Process 1900 may continue by calculating a real-time localized fatigue of the control surface at each of the at least two actuators based on the force fight and, the range and the mean of the force cycles to provide a calculated real-time localized fatigue (task 1914).

Process 1900 may continue by detecting a non-optimal actuator among the at least two actuators (task 1916).

Process 1900 may continue by developing a fatigue history based on the calculated real-time localized fatigue (task 1918). The fatigue history may comprise, for example but without limitation, a history of the calculated real-time localized fatigue, percentage of design life, parameters such as: an average force, a mean force, and a running average based on the calculated real-time localized fatigue, a sampling time, a fatigue increment threshold, a frequency threshold, or other suitable memory of fatigue history.

Process 1900 may continue by comparing the calculated real-time localized fatigue with corresponding values in the fatigue history (task 1920).

Process 1900 may continue by deactivating a monitored actuator among at least three actuators if the fatigue anomaly exceeds a fatigue increment threshold, wherein the at least two actuators comprise at least three actuators, and the monitored actuator force is from the monitored actuator (task 1922).

In this way, a system and methods are provided for monitoring a structural anomaly and deactivating an offending structure.

In this document, the terms "computer program product", "computer-readable medium", "computer readable storage medium", and the like may be used generally to refer to media such as, for example, memory, storage devices, or storage unit. These and other forms of computer-readable media may be involved in storing one or more instructions for use by the processor module 824 to cause the processor module 824 to perform specified operations. Such instructions, generally referred to as "computer program code" or "program code" (which may be grouped in the form of computer programs or other groupings), when executed, enable power utilization scheduling methods of the system 800.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 3-9 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A method for fatigue monitoring, the method comprising:
   receiving at a processor at least two measured actuator forces from at least two actuators respectively;
   calculating by action of the processor a hybrid force based on:
      a force fight of the at least two actuators calculated based on the at least two measured actuator forces, and
      a monitored actuator force among the at least two measured actuator forces;
   estimating by action of the processor an air load of the at least two actuators based on the at least two measured actuator forces; and
   determining by action of the processor a fatigue anomaly based on the hybrid force and the air load.

2. The method of claim 1, further comprising deactivating by action of the processor a monitored actuator among at least three actuators if the fatigue anomaly exceeds a fatigue increment threshold, wherein the at least two actuators comprise at least three actuators, and the monitored actuator force is from the monitored actuator.

3. The method of claim 1, wherein the hybrid force comprises a sum of a low-pass filter of the force fight and a high-pass filter of the monitored actuator force.

4. The method of claim 1, wherein the hybrid force comprises:
   the force fight below a frequency threshold; and
   the monitored actuator force above the frequency threshold.

5. The method of claim 1, wherein the force fight comprises a sum of differences of each of the at least two measured actuator forces from an expected force.

6. The method of claim 1, wherein the force fight comprises a mean of the at least two measured actuator forces subtracted from the monitored actuator force.

7. The method of claim 1, wherein the air load comprises an average of the at least two measured actuator forces.

8. The method of claim 1, further comprising:
   calculating by action of the processor a mean and a range of force cycles of the at least two actuators;

calculating by action of the processor a real-time localized fatigue of a control surface at each of the at least two actuators based on the force fight, the range, and the mean to provide a calculated real-time localized fatigue; and detecting by action of the processor a non-optimal actuator among the at least two actuators.

9. The method of claim 8, wherein the step of detecting further comprises:

calculating by action of the processor the real-time localized fatigue for all of actuators that are active from among the at least two actuators to provide the calculated real-time localized fatigue;

deciding by action of the processor that a first actuator whose fatigue increment exceeded a fatigue increment threshold first during a monitoring window is non-optimal if the first actuator has never been reactivated; and deciding by action of the processor that a second actuator other than the first actuator during a monitoring window is non-optimal if the second actuator has previously been reactivated.

10. The method of claim 8, wherein the step of detecting further comprises:

calculating by action of the processor the real-time localized fatigue for all of actuators that are active from among the at least two actuators to provide the calculated real-time localized fatigue;

indicating by action of the processor a fatigue increment event if a fatigue increment changed by more than a fatigue increment threshold during a monitoring window;

determining by action of the processor if the fatigue increment threshold is exceeded for more than one actuator simultaneously to provide fatigue increment threshold exceeded actuators;

indicating by action of the processor a priority event if any of the fatigue increment threshold exceeded actuators has a higher priority according to a predetermined hierarchy;

determining by action of the processor which of the at least two actuators are active and not active to indicate active actuators; and deciding by action of the processor which actuator is the non-optimal actuator based on the predetermined hierarchy and the active actuators.

11. The method of claim 10, further comprising determining by action of the processor if any of the fatigue increment threshold exceeded actuators is a high priority actuator according to the predetermined hierarchy.

12. The method of claim 10, further comprising:

developing by action of the processor a fatigue history based on the real-time calculated localized fatigue; and comparing by action of the processor the calculated real-time localized fatigue with corresponding values in the fatigue history.

13. The method of claim 12, wherein the fatigue history comprises the calculated real-time localized fatigue gathered within one of: a continuous flight time period, and a discrete time period.

14. A fatigue monitoring system comprising:

a force sensor operable to monitor at least two measured actuator forces from at least two actuators respectively;

a hybrid force computation module operable to calculate a hybrid force induced by the at least two actuators based on:

a force fight of the at least two actuators calculated based on the at least two measured actuator forces, and a monitored actuator force from among the at least two measured actuator forces;

an air load calculation module operable to estimate an air load of the at least two actuators based on the at least two measured actuator forces; and an anomaly isolation logic module operable to determine a fatigue anomaly based on the hybrid force and the air load and detect a non-optimal actuator.

15. The system of claim 14, wherein the force sensor is further operable to monitor a real-time pressure difference across pistons of the at least two actuators, wherein the at least two actuators are installed on a control surface.

16. The system of claim 14, further comprising a fatigue anomaly rate monitoring module operable to:

calculate a mean and a range of force cycles of the at least two actuators; and calculate a real-time localized fatigue of a control surface at each of the at least two actuators based on the force fight, the range, and the mean to provide a calculated real-time localized fatigue.

17. The system of claim 14, wherein the anomaly isolation logic module is further operable to:

calculate fatigue for all active actuators from among the at least two actuators;

determine if a fatigue increment changed by more than a fatigue increment threshold during a monitoring window;

determine if the fatigue increment threshold is exceeded for more than one actuator from among the at least two actuators;

determine if any of the at least two actuators for which the fatigue increment threshold exceeded has a higher priority according to a predetermined hierarchy;

determine which actuators are active and which actuators are not active to indicate active actuators from among the at least two actuators; and decide which actuator from among the at least two actuators is the non-optimal actuator based on the predetermined hierarchy and the active actuators.

18. A non-transitory computer readable storage medium comprising computer-executable instructions for performing a method for fatigue monitoring, the method executed by the computer-executable instructions comprising:

receiving at least two measured actuator forces from among at least two actuators respectively;

calculating a hybrid force based on:

a force fight of the at least two actuators calculated based on the at least two measured actuator forces; and a monitored actuator force from among the at least two measured actuator forces;

estimating an air load of the at least two actuators based on the at least two measured actuator forces; and determining a fatigue anomaly based on the hybrid force and the air load.

19. The non-transitory computer readable storage medium of claim 18, the method executed by the computer-executable instructions further comprising:

calculating fatigue for all active actuators from among the at least two actuators;

determining if a fatigue increment changed by more than a fatigue increment threshold during a monitoring window;

determining if the fatigue increment threshold is exceeded for more than one actuator from among the at least two actuators;

determining if any actuator from among the least two actuators for which the fatigue increment threshold exceeded has a higher priority according to a predetermined hierarchy;

determining which actuators are active and which actuators are not active to indicate active actuators among the at least two actuators; and deciding which actuator is a non-optimal actuator based on the predetermined hierarchy and the active actuators.

20. The non-transitory computer readable storage medium of claim 18, the method executed by the computer-executable instructions further comprising executing the method for fatigue monitoring at a reduced throughput by outputting a most recent hybrid force along with a previous hybrid force from a previous iteration.

* * * * *